US011321029B2

(12) United States Patent
Konji

(10) Patent No.: US 11,321,029 B2
(45) Date of Patent: May 3, 2022

(54) INFORMATION PROCESSING METHOD THAT EXECUTES PROCESSING BASED ON A SIGNAL RECEIVED FROM A COMMUNICATION APPARATUS IN A GROUP SATISFYING A PREDETERMINED CONDITION, AND INFORMATION PROCESSING APPARATUS

(71) Applicant: CANON KABUSHIKI KAISHA, Tokyo (JP)

(72) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/882,905

(22) Filed: May 26, 2020

(65) Prior Publication Data

US 2020/0379696 A1 Dec. 3, 2020

(30) Foreign Application Priority Data

May 31, 2019 (JP) .............................. JP2019-103175

(51) Int. Cl.
*G06F 3/12* (2006.01)
*H04W 4/80* (2018.01)

(52) U.S. Cl.
CPC .......... *G06F 3/1236* (2013.01); *G06F 3/1204* (2013.01); *G06F 3/1292* (2013.01); *H04W 4/80* (2018.02)

(58) Field of Classification Search
None
See application file for complete search history.

(56) References Cited

U.S. PATENT DOCUMENTS

| 2018/0359638 | A1 | 12/2018 | Konji |
| 2019/0014616 | A1* | 1/2019 | Martin ..................... H04W 8/24 |
| 2019/0174316 | A1* | 6/2019 | Diem ................ H04M 1/72457 |
| 2020/0228953 | A1* | 7/2020 | Thoukydides ........... H04B 7/00 |

FOREIGN PATENT DOCUMENTS

JP 2019067258 A 4/2019

* cited by examiner

*Primary Examiner* — Lennin R Rodriguezgonzalez
*Assistant Examiner* — Lennin R Rodriguez
(74) *Attorney, Agent, or Firm* — Venable LLP

(57) ABSTRACT

An information processing apparatus, which communicates with a plurality of communication apparatuses each belonging to one of a plurality of groups, receives a predetermined signal sent from each of the plurality of communication apparatuses, specifies a first group, among the plurality of groups, that satisfies a predetermined condition, and executes processing based on the predetermined signal sent from a communication apparatus belonging to the first group satisfying the predetermined condition, and does not execute the processing based on the predetermined signal sent from a communication apparatus belonging to a second group different from the first group. The first group is specified on the basis of that the first group includes greater than or equal to a predetermined percentage or greater than or equal to a predetermined number of communication apparatuses that sent the predetermined signal received by the information processing apparatus.

12 Claims, 17 Drawing Sheets

FIG. 9

SERVICE 00000000-0000-1000-1000-00405f9b34fb

CHARACTERISTIC 00000000-0000-2000-1000-00405f9b34fb

DESCRIPTOR 00000000-0000-2000-1000-00405f9b3400

| BEACON NAME | COMMUNICATION APPARATUS IDENTIFICATION INFORMATION | | |
|---|---|---|---|
| DEVICE NAME | GROUP | TOTAL NUMBER | PERMITTED RECEPTION ANGLE |
| BEACON 1203 | A | 3 | 360 DEGREES |
| BEACON 1204 | A | 3 | 180 DEGREES |
| BEACON 1206 | B | 4 | 360 DEGREES |
| BEACON 1207 | B | 4 | 180 DEGREES |
| BEACON 1205 | A | 3 | 180 DEGREES |
| BEACON 1210 | C | 2 | 180 DEGREES |
| BEACON 1211 | C | 2 | 180 DEGREES |

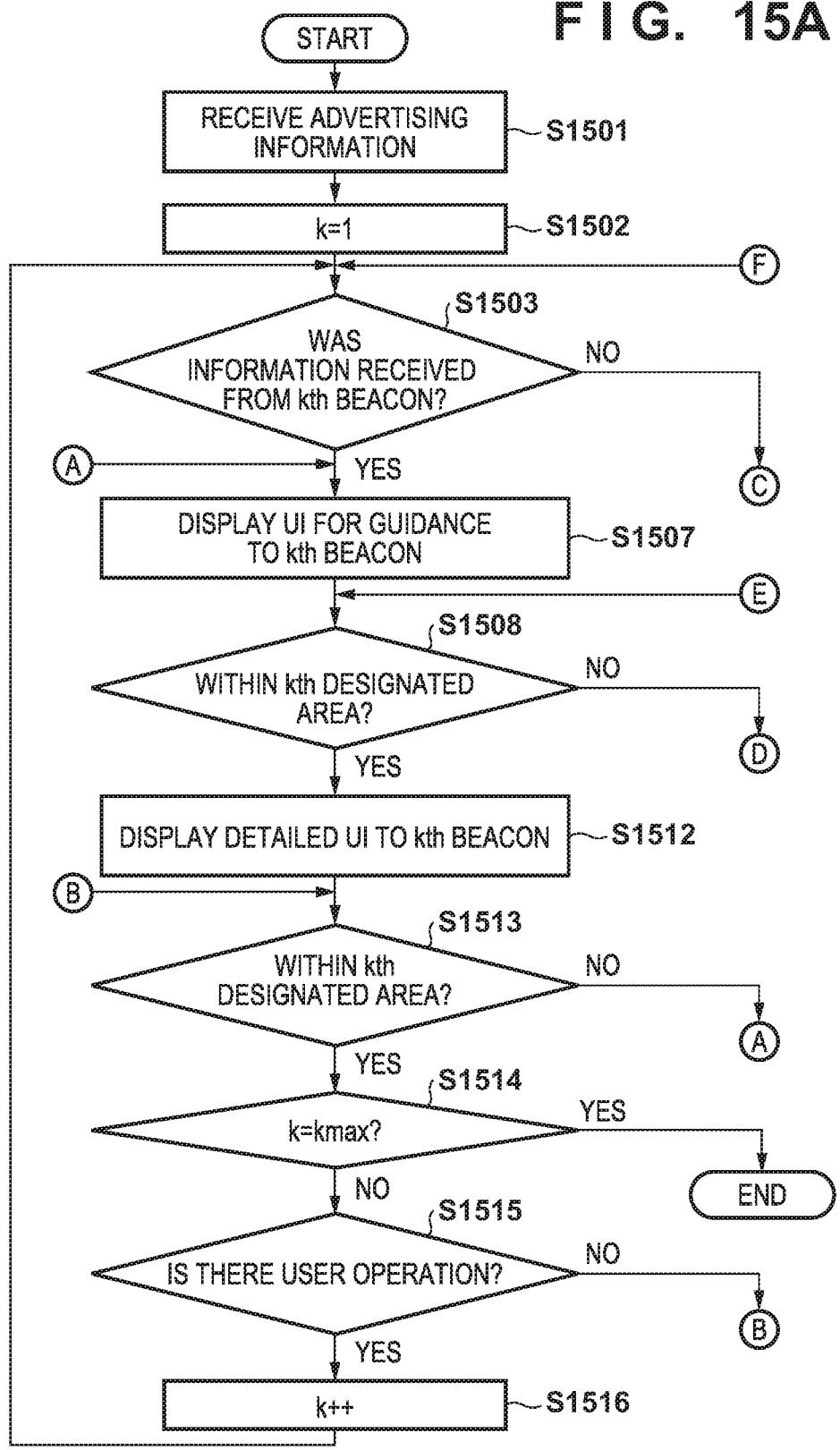

INFORMATION PROCESSING METHOD THAT EXECUTES PROCESSING BASED ON A SIGNAL RECEIVED FROM A COMMUNICATION APPARATUS IN A GROUP SATISFYING A PREDETERMINED CONDITION, AND INFORMATION PROCESSING APPARATUS

BACKGROUND OF THE INVENTION

Field of the Invention

The present invention relates to techniques for selecting information to be obtained.

Description of the Related Art

A system is known which includes a beacon generating apparatus that sends a beacon in accordance with a communication standard such as Bluetooth, and a beacon receiving apparatus that receives the beacon and executes processing in accordance with the received beacon (see Japanese Patent Laid-Open No. 2019-067258).

When a plurality of beacon generating apparatuses each sends a beacon, situations that cause a drop in convenience for users, such as the beacon receiving apparatus being unable to execute the appropriate processing, can arise.

SUMMARY OF THE INVENTION

The present invention provides a technique for improving convenience for a user in an information processing system which uses communication.

According to one aspect of the present invention, there is provided an information processing method executed by an information processing apparatus, the apparatus communicating with a plurality of communication apparatuses each belonging to one of a plurality of groups, the method comprising: receiving a predetermined signal sent from each of the plurality of communication apparatuses; specifying a first group, among the plurality of groups, that satisfies a predetermined condition; and executing processing based on the predetermined signal sent from a communication apparatus belonging to the first group satisfying the predetermined condition, and not executing the processing based on the predetermined signal sent from a communication apparatus belonging to a second group different from the first group, wherein the first group is specified as a group satisfying the predetermined condition on the basis of at least that the first group includes greater than or equal to a predetermined percentage or greater than or equal to a predetermined number of communication apparatuses that sent the predetermined signal received by the information processing apparatus.

According to another aspect of the present invention, there is provided an information processing method executed by an information processing apparatus, the apparatus communicating with a plurality of communication apparatuses each belonging to one of a plurality of groups, the method comprising: receiving a predetermined signal sent from each of the plurality of communication apparatuses; specifying a first group, among the plurality of groups, that satisfies a predetermined condition; and executing processing based on the predetermined signal sent from a communication apparatus belonging to the first group satisfying the predetermined condition, and not executing the processing based on the predetermined signal sent from a communication apparatus belonging to a second group different from the first group, wherein the first group is specified as a group satisfying the predetermined condition on the basis of that the first group includes greater than or equal to a predetermined percentage or greater than or equal to a predetermined number of communication apparatuses that sent the predetermined signal arriving within a predetermined angular range based on a direction in which the information processing apparatus is facing.

According to still another aspect of the present invention, there is provided an information processing method executed by an information processing apparatus, the method comprising: receiving a predetermined signal sent from each of a plurality of communication apparatuses; executing processing based on the predetermined signal sent from a first communication apparatus among the plurality of communication apparatuses; and when the information processing apparatus has moved to a predetermined area set for the first communication apparatus after the processing based on the predetermined signal sent from the first communication apparatus among the plurality of communication apparatuses has been executed, executing processing based on the predetermined signal sent from a second communication apparatus, among the plurality of communication apparatuses, that is different from the first communication apparatus.

Further features of the present invention will become apparent from the following description of exemplary embodiments (with reference to the attached drawings).

BRIEF DESCRIPTION OF THE DRAWINGS

FIG. 9 is a diagram illustrating a GATT data format.

FIGS. 15A and 15B are diagrams illustrating an example of the flow of processing executed by the information processing apparatus.

DESCRIPTION OF THE EMBODIMENTS

Figure 1:
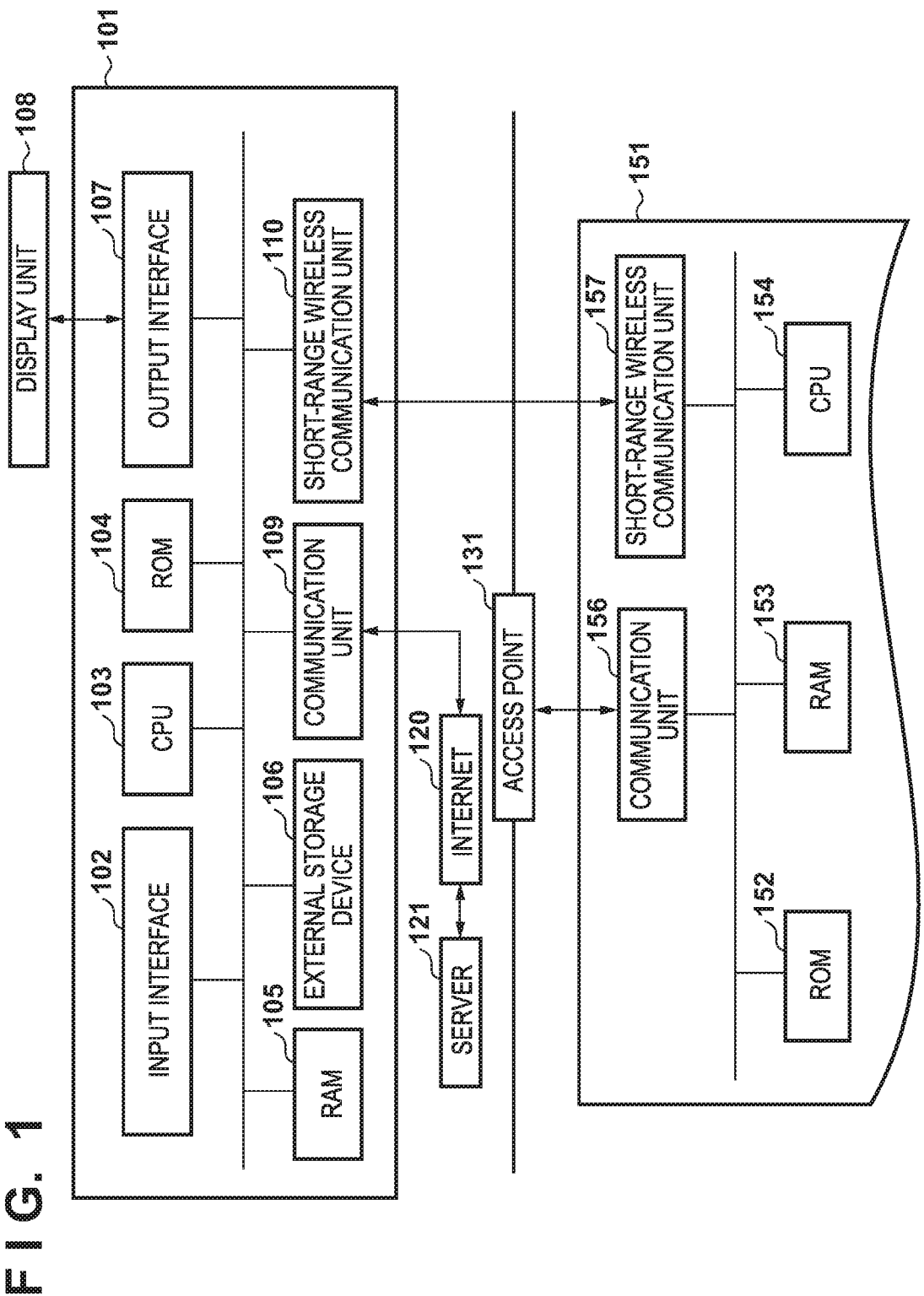
FIG. 1 is a diagram illustrating an example of a system configuration and an example of the hardware configurations of apparatuses.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Communication System

FIG. 1 illustrates an example of the configuration of a communication system, as well as apparatuses within the system, according to the present embodiment. The communication system includes, for example, an information processing apparatus 101, an access point 131, and a communication apparatus 151. The communication system also includes a network such as the Internet 120, and a server 121 capable of communicating with the information processing apparatus 101 (and, depending on the situation, the communication apparatus 151) over the network. The information processing apparatus 101 can be any type of information processing apparatus, such as a smartphone, a mobile terminal, a laptop computer (personal computer, or PC), a tablet terminal, a Personal Digital Assistant (PDA), a digital camera, or the like. The following will assume that the information processing apparatus 101 is a smartphone. Furthermore, the communication apparatus 151 is assumed to be a beacon generating apparatus. However, the configuration is not limited thereto, and the communication apparatus 151 can be any type of electronic device, such as a printer, for example, as long as the device can communicate wirelessly with the information processing apparatus 101. If the communication apparatus 151 is a printer, the printer can be any of a variety of types of printers, such as an ink jet printer, a full-color laser printer, a black-and-white printer, or the like. The communication apparatus 151 may be a photocopier, a facsimile device, a mobile terminal, a smartphone, a laptop PC, a tablet terminal, a PDA, a digital camera, a music playback device, a television, or the like. Furthermore, the communication apparatus 151 may be a multi function peripheral having a plurality of functions, such as a photocopying function, a fax function, a printing function, and so on. In one example, the communication apparatus 151 is built into an illumination device, digital signage, or the like. In other words, the communication apparatus 151 may be realized in any form as long as it is capable of functioning as the beacon generating apparatus.

In one example, the information processing apparatus 101 includes an input interface 102, a CPU 103, ROM 104, RAM 105, an external storage device 106, an output interface 107, a communication unit 109, and a short-range wireless communication unit 110. These blocks are connected to each other using an internal bus, for example. CPU is an acronym of "Central Processing Unit", ROM is an acronym of "Read Only Memory", and RAM is an acronym of "Random Access Memory". Although FIG. 1 illustrates a display unit 108 (an external display device) as being present outside the information processing apparatus 101, the display unit 108 may be an information presenting device such as a display built into the information processing apparatus 101. Note that these configurations are examples, and the information processing apparatus 101 may include blocks aside from those that are illustrated. Additionally, a plurality of the blocks illustrated in FIG. 1 may be consolidated into a single block, and a single block may be divided into two or more blocks. In other words, the information processing apparatus 101 can have any configuration within a scope in which the processing that will be described later can be executed.

The CPU 103 is a system controller, and controls the information processing apparatus 101 as a whole. The ROM 104 stores fixed data such as control programs executed by the CPU 103, data tables, embedded operating system (OS) programs, and so on. In the present embodiment, the control programs stored in the ROM 104 are used to carry out software execution control, such as scheduling, task switching, interrupt processing, and the like, under the management of the embedded OS stored in the ROM 104. The RAM 105 is constituted by Static RAM (SRAM) which requires a backup power source, for example. Note that the RAM 105 holds data in a primary battery for data backup (not shown), and can therefore store data such as program control variables in a non-volatile state. A memory area for storing setting information of the information processing apparatus 101, management data of the information processing apparatus 101, and so on is also provided in the RAM 105. The RAM 105 is used as a main memory and a working memory for the CPU 103. The external storage device 106 stores an application for providing a printing execution function. Additionally, the external storage device 106 stores various types of programs, such as an information transmission/reception control program for transmitting and receiving information to and from the communication apparatus 151, which is connected via the communication unit 109, the short-range wireless communication unit 110, and so on. Various types of information used by these programs, image data obtained from another information processing apparatus or the Internet via the communication unit, and so on can also be stored in the external storage device 106.

The input interface 102 is an interface for accepting data input, operational instructions, and so on from a user, and is constituted by a physical keyboard, buttons, or the like. The output interface 107 is an interface for carrying out control for causing the display unit 108 to display data, make notifications of the state of the information processing apparatus 101, and so on. The display unit 108 is configured including light-emitting diodes (LEDs), a liquid crystal display (LCD), or the like, and displays data, notifies the user of the state of the information processing apparatus 101, and so on. Note that the input interface 102 for accepting user operations and the output interface 107 (described later) for outputting screens (as well as the display unit 108) may be realized as a single device, such as a touch panel or the like. For example, input from the user can be accepted through the display unit 108 by displaying, in the display unit 108, a software keyboard including numerical value input keys, a mode setting key, a confirm key, a cancel key, a power key, and the like. Note that the output interface 107 may carry out control for presenting information to an output unit (not shown) which uses audio output, vibration output, or the like.

The communication unit 109 is configured including a circuit, an interface, and the like for connecting to a device such as a server or the like and executing data communication. For example, the communication unit 109 can include a wireless communication interface and a communication circuit for wireless communication. Note that the communication unit 109 may include a wired communication interface and a communication circuit for wired communication. When the communication unit 109 carries out wireless communication, a method such as cellular communication, e.g., Long Term Evolution (LTE), Wi-Fi (registered trademark), Bluetooth (registered trademark), or the like can be used, but a method aside from these may be used as well. Here, "Wi-Fi" is an abbreviation of "Wireless Fidelity". The communication unit 109 is used for the information processing apparatus 101 to connect to the server 121 over the Internet 120, for example. Here, the communication unit 109 may communicate with the server 121 via a device located outside the information processing apparatus 101 and the communication apparatus 151 (e.g., the access point 131, a cellular base station, or the like). The communication unit 109 may also communicate directly with a communication function provided in the server 121 (over a hard-wire cable or a wireless communication antenna), for example. The access point 131 is a device such as a wireless LAN router or the like, for example.

The short-range wireless communication unit 110 is a device that wirelessly connects the information processing apparatus 101 to another apparatus, such as the communication apparatus 151, present within a set short range, and is configured including a circuit, an antenna, and the like for executing data communication. The short-range wireless communication unit 110 operates according to a wireless communication standard different from that of the communication unit 109. For example, the short-range wireless communication unit 110 can operate according to the Bluetooth 5.1 standard, and the communication unit 109 can operate according to the IEEE 802.11 series wireless LAN standard.

In one example, the communication apparatus 151 includes ROM 152, RAM 153, a CPU 154, a communication unit 156, and a short-range wireless communication unit 157. These blocks are connected to each other using an internal bus, for example. Note that these configurations are examples, and the communication apparatus 151 may include blocks aside from those that are illustrated. Additionally, a plurality of the blocks illustrated in FIG. 1 may be consolidated into a single block, and a single block may be divided into two or more blocks. In other words, the communication apparatus 151 can have any configuration within a scope in which the processing that will be described later can be executed.

The CPU 154 is a system controller, and controls the communication apparatus 151 as a whole. The RAM 153 is constituted by SRAM which requires a backup power source. Note that the RAM 153 holds data in a primary battery for data backup (not shown), and can therefore store important data such as program control variables in a non-volatile state. A memory area for storing setting information of the communication apparatus 151, management data of the communication apparatus 151, and so on is also provided in the RAM 153. The RAM 153 is also used as a main memory and working memory for the CPU 154, and includes a reception buffer for temporarily storing information received from an external apparatus or the like and used in the guide app, stores various types of information, and so on. The ROM 152 stores fixed data such as control programs executed by the CPU 154, data tables, OS programs, and so on. In the present embodiment, the control programs stored in the ROM 152 are used to carry out software execution control, such as scheduling, task switching, interrupt processing, and the like, under the management of the embedded OS stored in the ROM 152.

The communication unit 156 is configured including an antenna, a circuit, and so on for communicating according to a wireless communication standard such as wireless LAN or the like, for example. The communication unit 156 can connect to the access point 131 as a wireless LAN station, for example. Additionally, the communication unit 156 may function as a wireless LAN access point, and may connect to another communication apparatus functioning as a station. The communication unit 156 may also itself function as a station, and carry out inter-terminal communication with another communication apparatus functioning as a station. The communication unit 156 may be configured to communicate according to another wireless communication standard, such as Bluetooth or the like, or a wired communication standard. Note that the communication unit 156 may be configured including an interface, a circuit, and the like for wired communication.

The short-range wireless communication unit 157 is a device that wirelessly connects the communication apparatus 151 to another apparatus, such as the information processing apparatus 101, present within a set short range, and is configured including a circuit, an antenna, and the like for executing data communication. The short-range wireless communication unit 157 operates according to a wireless communication standard different from that of the communication unit 156.

Note that memory such as an external HDD, an SD card, or the like may be attached to the communication apparatus 151 as an optional device, and the information stored in the communication apparatus 151 may be stored in that memory. The communication apparatus 151 can also include an input unit constituted by mechanical switch buttons and the like (not shown), and can therefore be configured to be capable of accepting user input, such as power control, making basic settings, and so on. Furthermore, the communication apparatus 151 may include a simple display unit constituted using a light-emitting diode (LED) or the like (not shown), and may be configured to be capable of displaying states pertaining to the power, communication, and so on of the communication apparatus 151 using this display unit.

The present embodiment assumes that the short-range wireless communication unit 110 and the short-range wireless communication unit 157 carry out wireless communication according to the Bluetooth 5.1 standard. Although Bluetooth 5.1 includes the Classic Bluetooth standard and the Bluetooth Low Energy (BLE) standard, the short-range wireless communication unit 110 and the short-range wireless communication unit 157 are assumed to operate according to the BLE standard. The present embodiment furthermore assumes that the short-range wireless communication unit 157 functions as an advertiser (or a "slave") which broadcasts advertising information (described later), and the short-range wireless communication unit 110 functions as a scanner (or a "master") which receives the advertising information. The communication unit 109 and the communication unit 156 will be described as carrying out communication over a wireless LAN (Wi-Fi).

The present embodiment assumes that the information processing apparatus 101 stores a program for executing a predetermined application in the ROM 104, the external storage device 106, or the like. A "predetermined application" can be, for example, an application program for detecting the communication apparatus 151 via the short-range wireless communication unit 110 and then displaying location information related to the communication apparatus 151, information corresponding to that location information, and so on. An application having such functions will be called a "guide app" hereinafter. The present embodiment will describe a situation where the guide app is used to provide information about shops selling products, guidance about the products handled by the shops, and so on. However, the predetermined application is not limited to a guide app, and may be an application providing functions aside from guide functions, in addition to or instead of the guide app.

Overview of Advertising

Figure 2:
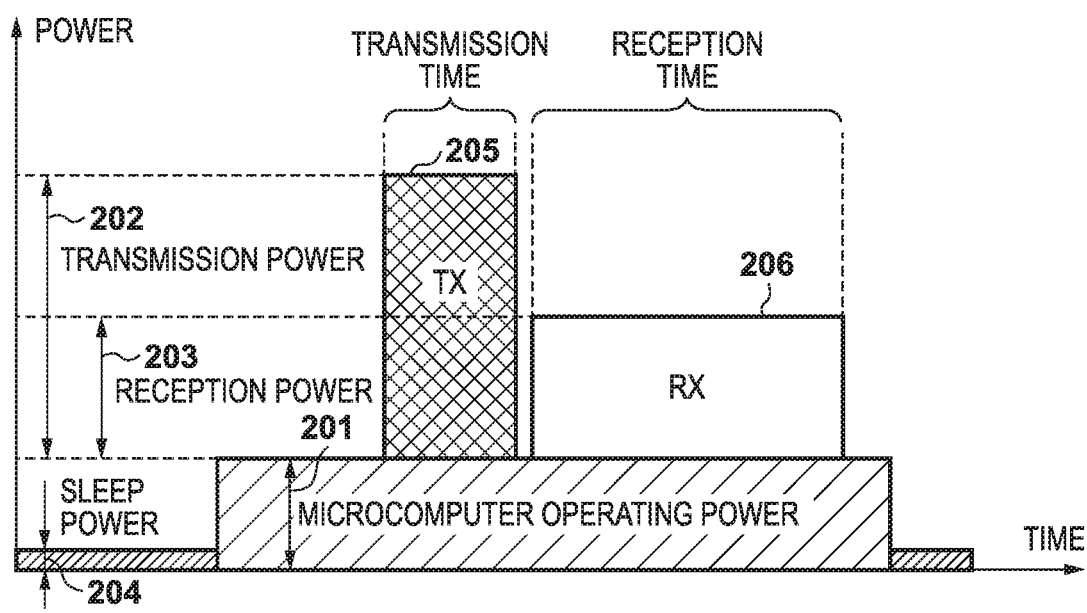
FIG. 2 is a diagram illustrating an overview of a process for transmitting advertising information and receiving connection request information.

Processing for transmitting advertising information according to the BLE standard and receiving a BLE connection request will be described next. In the present embodiment, the short-range wireless communication unit 157, which functions as a slave device as mentioned earlier, carries out the processing for transmitting the advertising information and receiving the BLE connection request. With BLE, a 2.4 GHz frequency band is divided into 40 channels (0 to 39 ch), and communication is carried out using those channels. Of these channels, the 37th to 39th channels are used for advertising information transmission and BLE connection request reception, while the 0th to 36th channels are used for data communication after the BLE connection has been established. FIG. 2 illustrates the power consumed when transmitting the advertising information using a single channel, on a process-by-process basis. Note that in FIG. 2, the horizontal axis represents the power consumed by the short-range wireless communication unit 157, and the horizontal axis represents time. TX 205 indicates the total power consumed in a transmission process for broadcasting the advertising information. RX 206 indicates the total power consumed in a reception process which activates a receiver for receiving the BLE connection request. In this manner, after carrying out the transmission process using a predetermined channel (TX 205), the short-range wireless communication unit 157 stands by for the transmission of the BLE connection request from the information processing apparatus 101 by carrying out the reception process using the same channel (RX 206) for a set amount of time. Transmission power 202 indicates instantaneous power consumption by the transmission process. Reception power 203 indicates instantaneous power consumption by the reception process. Additionally, microcomputer operation power 201 indicates instantaneous power consumption when a microcomputer in the short-range wireless communication unit 157 is operating. Because it is necessary for the microcomputer to be started up in order to execute or stop processing for transmitting and receiving signals, the microcomputer is set so as to operate during the periods of TX 205 and RX 206, as well as before and after those periods. Additionally, if the advertising information is transmitted over a plurality of channels, the power consumption increases by the number of channels used for the advertising information transmission and the standby for the BLE connection request reception. While the microcomputer is not operating and is in a power-save state, the instantaneous power consumption by the short-range wireless communication unit 157 is reduced to sleep power 204.

Figure 3:
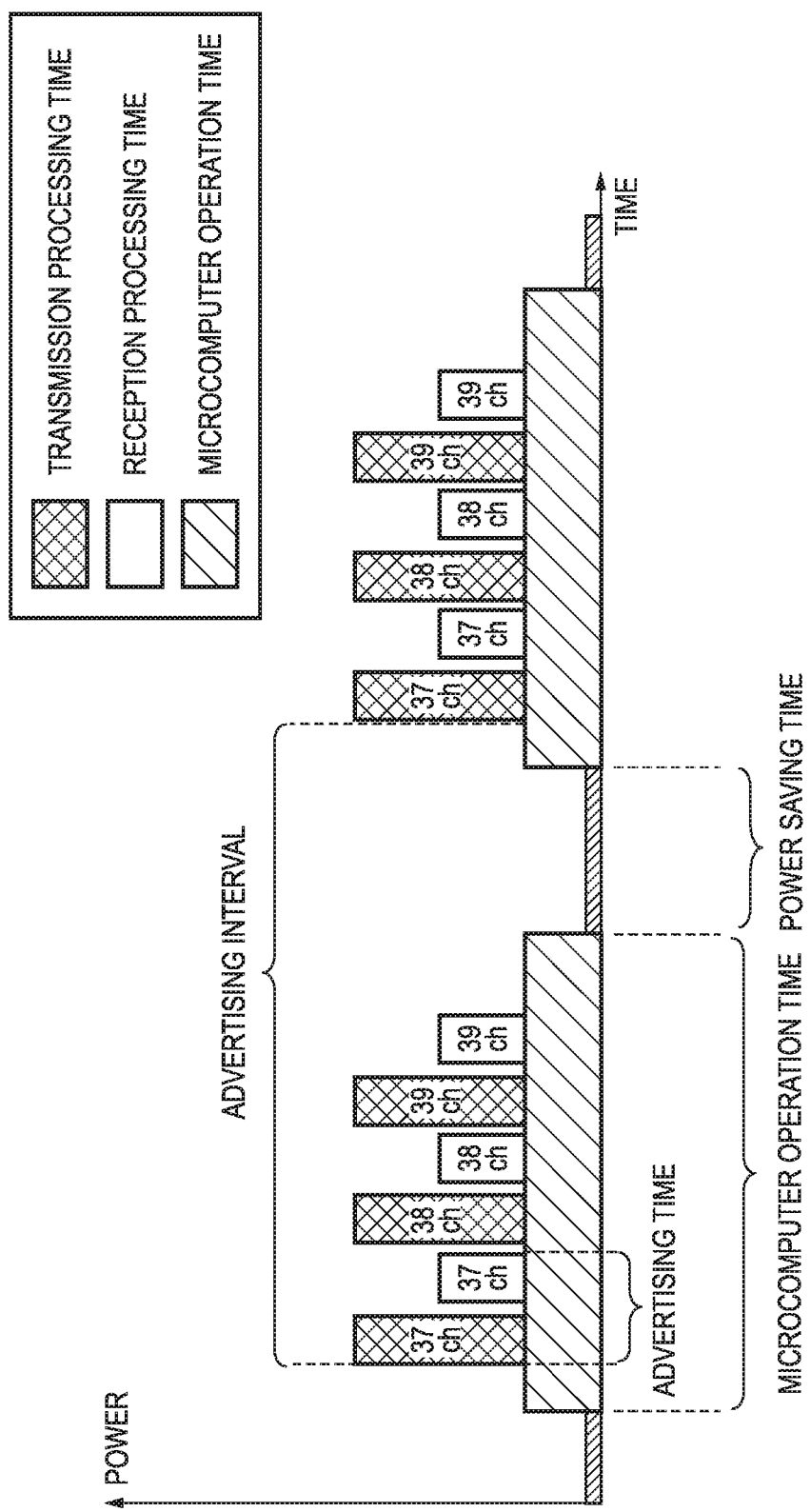
FIG. 3 is a diagram illustrating an overview of an advertising process in BLE.

As illustrated in FIG. 3, the short-range wireless communication unit 157 carries out the advertising information transmission process and reception process once for each of three channels, for a total of three repetitions, and then stops the operation of the microcomputer to transition to a power-save state for a set amount of time. In the following, the advertising information transmission process and the BLE connection request reception process on a predetermined channel will collectively be called "advertising". Additionally, an interval of time spanning from when advertising information is transmitted on a predetermined channel to when the next advertising information is transmitted on the same channel will be called an "advertising interval". Note that the number of pieces of advertising information repeatedly transmitted after the first transmission of advertising information until the power-save state can be set to any desired number of 3 or lower. Although FIG. 3 illustrates the 37th channel being used first, the 38th channel being used next, and the 39th channel being used last during advertising, this order may be random instead. Additionally, this order may differ between the first advertising and the second advertising, and furthermore, the order used in at least one of the first advertising and the second advertising may be different from the order used in the third and subsequent advertisings.

Figure 4:
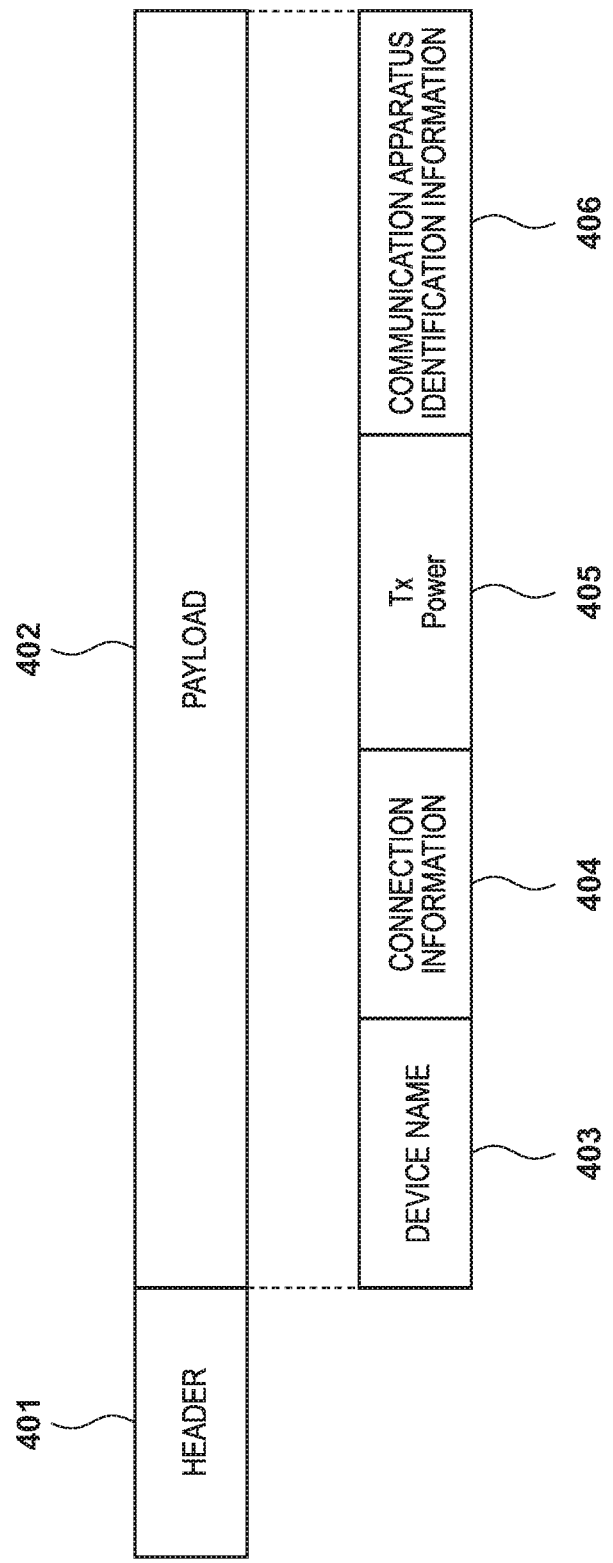
FIG. 4 is a diagram illustrating an example of the configuration of advertising information.

FIG. 4 illustrates an example of the configuration of the advertising information broadcast to the periphery of the communication apparatus 151 by the short-range wireless communication unit 157.

When the supply of power is started, the short-range wireless communication unit 157 carries out an initialization process, and enters an advertising state. Upon entering the advertising state, the short-range wireless communication unit 157 periodically broadcasts the advertising information to the periphery at a cycle corresponding to the advertising interval. The advertising information is a signal including basic header information (identification information and the like for identifying the apparatus transmitting that advertising information), and is configured including a header 401 and a payload 402. The information processing apparatus 101 can recognize the presence of the communication apparatus 151 by receiving this advertising information. Additionally, the information processing apparatus 101 can make a BLE connection with the communication apparatus 151 by transmitting a BLE connection request to the communication apparatus 151 on the basis of the communication apparatus 151 obtained using the advertising information. The header 401 is an area storing information such as a Protocol Data Unit (PDU) type of advertising information, the size of the payload 402, and so on. When advertising information having a predetermined PDU type has been received, the short-range wireless communication unit 110 can issue a scan request (SCAN_REQ) to the short-range wireless communication unit 157. Upon receiving the scan request, the short-range wireless communication unit 157 transmits scan response information (SCAN_RSP) as a response to that scan request. By receiving the scan response information through the short-range wireless communication unit 110, the information processing apparatus 101 can obtain additional information from the communication apparatus 151, in addition to the information that can be obtained from the advertising information. The payload 402 includes information such as a device name 403 as identification information, installed profile information, connection information 404 for making a BLE connection with the communication apparatus 151, advertising information transmission power (TX Power) 405, and so on. Note that identification information 406 of the communication apparatus 151 may be included in the advertising information. The identification information 406 of the communication apparatus 151 includes a MAC address of the communication apparatus 151, for example. The identification information 406 of the communication apparatus 151 may also include service information of the communication apparatus 151, and, if the communication apparatus 151 has access point functionality, an SSID or the like of that access point.

The present embodiment assumes that when the power of the communication apparatus 151 has been turned on, the short-range wireless communication unit 157 enters the advertising state and commences transmission of the advertising information. However, the short-range wireless communication unit 157 may commence the transmission of the advertising information at a predetermined timing based on a predetermined operation for activating BLE functionality being carried out, for example, instead of when the power is turned on. The transmission of the advertising information may be commenced at a different timing as well.

The short-range wireless communication unit 157 can transmit first advertising information, and when a scan request has been received from the information processing apparatus 101 in response to the first advertising information within a predetermined period, can transmit second advertising information as a scan response. In one example, the first advertising information includes information pertaining to the advertising information transmission power, the identification information of the short-range wireless communication unit 157, and so on, and the second advertising information includes identification information of the communication apparatus 151, information pertaining to the functions, hardware, and so on of the communication apparatus 151, and the like. Based on this configuration, applications such as the guide app are designed as applications that handle the second advertising information. As such, it is assumed that the advertising information handled by the guide app (described later) is the second advertising information. Note that the information processing apparatus 101 can receive the first advertising information and the second advertising information sent from a plurality of communication apparatuses 151, and can handle that advertising information using a predetermined application such as the guide app.

The short-range wireless communication unit 157 of the communication apparatus 151 can transmit a signal with directionality by carrying out control for increasing an antenna gain with respect to a predetermined direction. Accordingly, if, for example, the communication apparatus 151 is installed with its rear surface facing a wall surface, the communication apparatus 151 can transmit signals in directions within a range in front of its front surface (e.g., a 180° range in the direction opposite from the wall surface).

Figure 5:
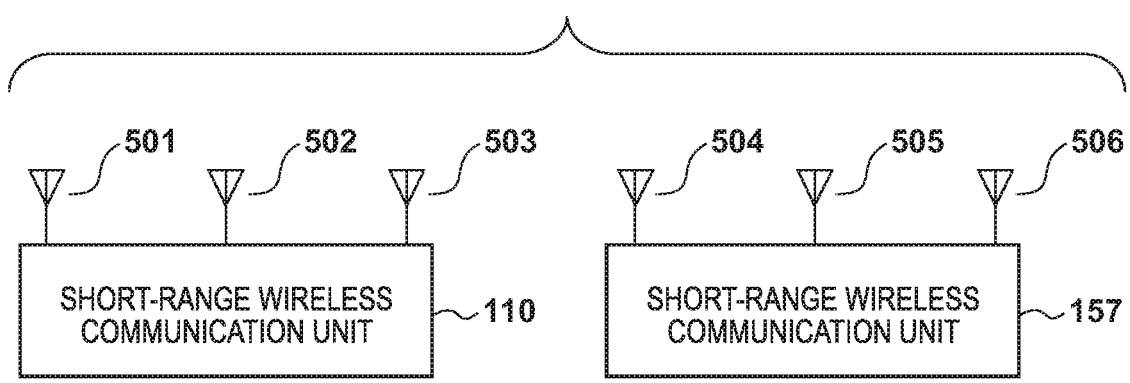
FIG. 5 is a diagram illustrating an example of the configuration of a short-range wireless communication unit that executes a direction estimating process.

Additionally, the short-range wireless communication unit 110 of the information processing apparatus 101 can estimate in which direction the communication apparatus 151 is located, on the basis of the advertising information transmitted by the short-range wireless communication unit 157 of the communication apparatus 151. The following will describe a method through which the information processing apparatus 101 estimates the direction in which the communication apparatus 151 is located, with reference to FIGS. 5 to 8. In one example, the short-range wireless communication unit 110 of the information processing apparatus 101 can include antennas 501 to 503, and the short-range wireless communication unit 157 of the communication apparatus 151 can include antennas 504 to 506, as illustrated in FIG. 5. Note that these are merely examples, however, and the short-range wireless communication unit 110 and the short-range wireless communication unit 157 may have only one or two antennas, or may have four or more antennas. Additionally, the short-range wireless communication unit 110 and the short-range wireless communication unit 157 may have different numbers of antennas. Furthermore, although the example in FIG. 5 illustrates the antennas of the short-range wireless communication unit 110 and the short-range wireless communication unit 157 as being disposed along a straight line, the configuration is not limited thereto. For example, the antennas may be disposed two-dimensionally on a plane, or may be disposed three-dimensionally.

Figure 6:
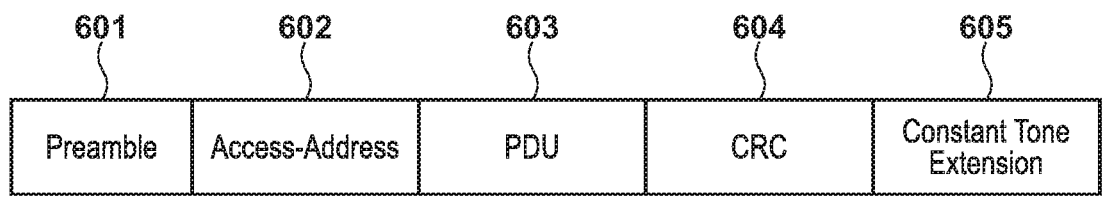
FIG. 6 is a diagram illustrating an example of a BLE frame format.

FIG. 6 illustrates an example of a BLE frame format used when the short-range wireless communication unit 157 of the communication apparatus 151 transmits a signal such as the advertising information. Preamble 601 holds a bit string used by the apparatus that receives the frame to obtain the timings of the bit units in that frame. Access-Address 602 holds a bit string used by the apparatus that receives the frame to obtain the timings of the byte units in that frame. By using the Preamble 601 and the Access-Address 602 to establish timing synchronization, the information processing apparatus 101 can read the content of a PDU that follows thereafter. PDU 603 stores real data of the advertising information transmitted by the communication apparatus 151. The advertising information including the header 401 and the payload 402 described with reference to FIG. 4 is stored in the PDU 603. CRC 604 stores error detection code values use when communicating the PDU 603. Constant Tone Extension (CTE) 605 includes a tone used for the information processing apparatus 101 to detect the direction of the communication apparatus 151. Note that CTE 605 may store some kind of information for the short-range wireless communication unit 110 to estimate the direction of the short-range wireless communication unit 157, for example.

Methods by which the information processing apparatus 101 estimates the direction of the communication apparatus 151 can be classified into (1) a method implemented when the short-range wireless communication unit 110 (receiving side) includes a plurality of antennas and (2) a method implemented when the short-range wireless communication unit 157 includes a plurality of antennas.

Of these methods, the method (1) will be described with reference to FIG. 7. In the configuration illustrated in FIG. 7, the short-range wireless communication unit 110, which is the receiving-side device, uses the plurality of antennas to estimate an angle of arrival of received radio waves, on the basis of phase differences between the radio waves when the waves arrive at the respective antennas. The angle of arrival may be referred to as "AoA" hereinafter.

Figure 7:
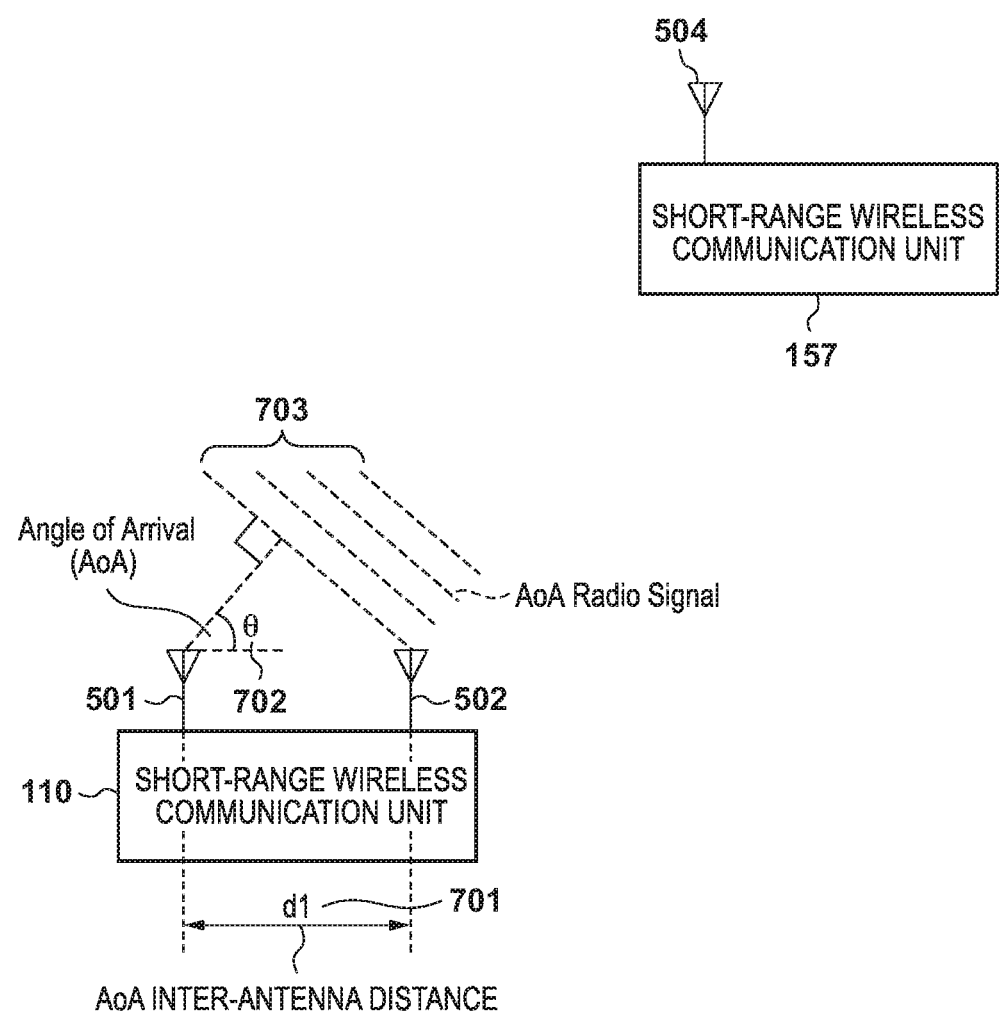
FIG. 7 is a diagram illustrating principles of the direction estimating process.

In FIG. 7, the short-range wireless communication unit 157 uses the antenna 504 to transmit the advertising information in a radio frame (AoA Radio Signal 703) including the CTE 605. The short-range wireless communication unit 110 receives that radio frame using a plurality of antennas (both the antenna 501 and the antenna 502). At this time, it is assumed that an inter-antenna distance 701 between the antenna 501 and the antenna 502 is d1, and an AoA 702 is θ. In this case, the radio wave received by the antenna 501 is received over a distance longer by d1×cos(θ) than the distance at which the radio wave is received by the antenna 502. As such, when the wavelength of the radio waves is represented by λ, the phase of the radio wave received by the antenna 501 is delayed relative to the phase of the radio wave received by the antenna 502, by the following amount:

$$\psi 1 = 2\pi \times (d1 \times \cos(\theta)/\lambda)$$ Equation (1)

Here, ψ1 represents a difference between the phase of the radio wave received by the antenna 502 and the phase of the radio wave received by the antenna 501. Based on Equation (1), the AoA 702 can be calculated as follows:

$$\theta = \arccos((\psi1 \times \lambda)/(2\pi \times d1)) \quad \text{Equation (2)}$$

Accordingly, the information processing apparatus 101 can estimate the direction of the communication apparatus 151 by carrying out a calculation such as that indicated by Equation (2).

The method (2) of the aforementioned methods will be described next with reference to FIG. 8. With the configuration illustrated in FIG. 8, the advertising information is transmitted in a radio frame (AoD Radio Signal 803) including the CTE 605 from the plurality of antennas of the short-range wireless communication unit 157, which is a transmitting-side device, in mutually-different periods. For example, assume that as illustrated in FIG. 8A, transmission periods are set for the transmission of the AoD Radio Signal 803 from the antenna 504 and the antenna 505, with the transmission period for the antenna 505 coming immediately after the transmission period for the antenna 504. In this case, in the short-range wireless communication unit 157, no non-signal period arises between the transmission of the AoD Radio Signal 803 from the antenna 504 and the transmission of the AoD Radio Signal 803 from the antenna 505. On the other hand, the short-range wireless communication unit 110 can receive these wireless signals in the format indicated by (B) in FIG. 8. In other words, the signal transmitted from the antenna 505 travels a longer path than the signal transmitted from the antenna 504, and arrives at the short-range wireless communication unit 110 later, and thus a non-signal period arises between the signals. If the antenna 505 has transmitted the signal first, the signal transmitted from the antenna 504 will reach the short-range wireless communication unit 110 before the entire signal transmitted from the antenna 505 reaches the short-range wireless communication unit 110. Additionally, if a non-signal period of a predetermined length is set after the signal transmission period of the antenna 504 is complete, and a signal transmission period from the antenna 505 has also been set, that non-signal period will be observed as being longer than the predetermined length in the wireless signals received by the short-range wireless communication unit 110. Likewise, if a non-signal period of a predetermined length is set after the signal transmission period of the antenna 505 is complete, and a signal transmission period from the antenna 504 has also been set, that non-signal period will be observed as being shorter than the predetermined length in the wireless signals received by the short-range wireless communication unit 110. In this manner, the signals respectively transmitted from a plurality of antennas are observed as having shifted timings at the short-range wireless communication unit 110, in accordance with the lengths of the paths the signals travel. Scheduling information indicating which antenna a signal is transmitted from, and at which timing, is communicated to the short-range wireless communication unit 110 in advance (e.g., from the short-range wireless communication unit 157 or another device) in order to observe the timing shifts.

Note that the shift in reception timing corresponds to a shift in the phase of the received signal. For example, in the example illustrated in FIG. 8, the signal transmitted from the antenna 505 travels a path longer than that of the signal transmitted from the antenna 504 by d2×cos(φ) before arriving at the short-range wireless communication unit 110. Here, d2 is an inter-antenna distance 801 between the antenna 504 and the antenna 505. Assuming the propagation velocity of light is c, the difference in the lengths of paths produces a reception timing shift of d2×cos(φ)/c seconds, but at the same time, the following phase difference also arises:

$$\psi2 = 2\pi \times d2 \times \cos(\varphi)/\lambda, \quad \text{Equation (3)}$$

As described above, λ represents the wavelength of the radio waves. φ represents an angle formed by a straight line connecting the short-range wireless communication unit 157 with the short-range wireless communication unit 110 and a straight line connecting the antenna 504 with the antenna 505. This angle is called the "Angle of Departure", and will be indicated as "AoD 802" hereinafter. The short-range wireless communication unit 110 can specify a phase difference ψ2 by carrying out correlation detection or the like using the first signal received among the plurality of signals transmitted from the short-range wireless communication unit 157, for example. The short-range wireless communication unit 110 can then use the phase difference ψ2 from Equation (3) to calculate the AoD 802 as follows:

$$\varphi = \arccos((\psi2 \times \lambda)/(2\pi \times d2)) \quad \text{Equation (4)}$$

Note that the short-range wireless communication unit 110 obtains information of the inter-antenna distance d2 from the short-range wireless communication unit 157 or another device in advance. The short-range wireless communication unit 110 can specify the direction of the short-range wireless communication unit 110 from the standpoint of the short-range wireless communication unit 157 by calculating the AoD 802 as indicated by Equation (4). Additionally, by knowing how the antenna 504 and the antenna 505 are arranged, the short-range wireless communication unit 110 can estimate the direction from which a radio wave has arrived on the basis of the AoD 802. In other words, if the antenna 504 is located to the west of the antenna 505 and the AoD 802 has been estimated at 45°, the short-range wireless communication unit 110 can estimate that a radio wave has arrived from a southeasterly direction. Furthermore, the short-range wireless communication unit 110 can estimate a distance from the short-range wireless communication unit 157 on the basis of a radio wave reception strength and the transmission power of that radio wave, and can therefore recognize a positional relationship with the short-range wireless communication unit 157. The short-range wireless communication unit 110 can estimate its own location with a high level of precision by obtaining information of the location where the short-range wireless communication unit 157 is disposed.

Figure 8:
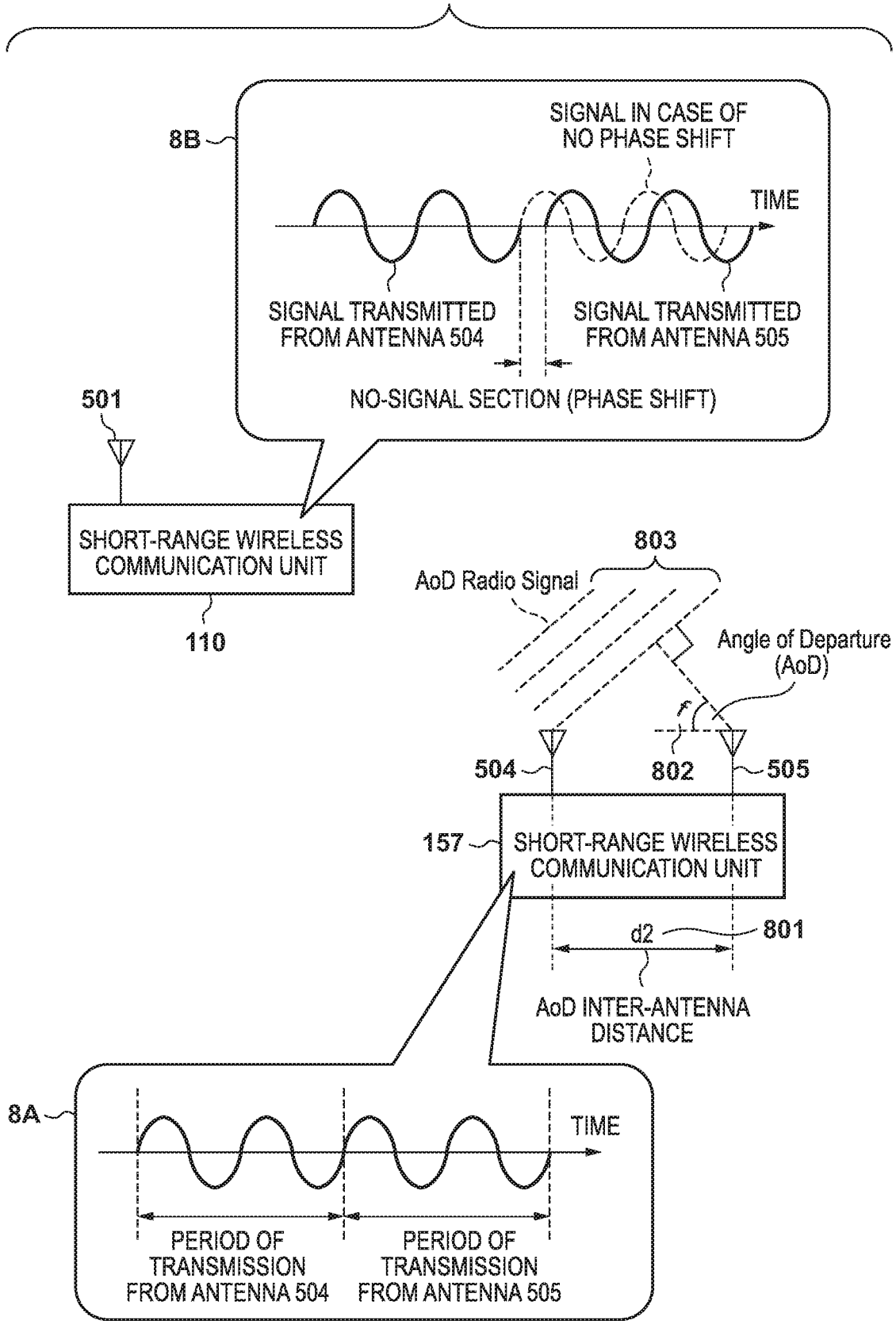
FIG. 8 is a diagram illustrating principles of the direction estimating process.

Although FIGS. 7 and 8 illustrate an example in which each short-range wireless communication unit has only some of the antennas illustrated in FIG. 5, the units may of course include three antennas as illustrated in FIG. 5, or may include a higher number of antennas. For example, the short-range wireless communication unit 110 may use three or more antennas, calculate the AoA for each of pairs among the plurality of antennas, and estimate the average of those AoAs as the AoA 702. Likewise, for the signals transmitted from three or more antennas used by the short-range wireless communication unit 157, the short-range wireless communication unit 110 may calculate the AoD for each of pairs among the plurality of antennas, and estimate the average of those AoDs as the AoD 802.

Although the foregoing describes an example of a method in which the information processing apparatus 101 estimates the direction in which a single communication apparatus 151 is located, the method is not limited thereto. The information processing apparatus 101 may estimate positional relationships with two or more communication apparatuses 151. By estimating the positional relationships with two or more communication apparatuses 151 and using the respective estimation results, the information processing apparatus 101 can estimate the distance between apparatuses, the directions, the locations, and the like with a high level of accuracy.

An overview of Generic Attribute Profile (GATT) communication according to the BLE standard will be described next. GATT is a profile which governs the reading and writing (transmission and reception) of information in the BLE standard. GATT defines two roles, namely a "GATT client" and a "GATT server", on the basis of the origin and destination of data. The GATT client has a role of transmitting a request to the GATT server and receiving a response from the GATT server. The GATT server has a role of returning a response after receiving a request from the GATT client. Note that the GATT server operates as a device which stores information such as GATT server state information and the like. The present embodiment assumes that the information processing apparatus 101 is the GATT client and the communication apparatus 151 is the GATT server. In other words, the information processing apparatus 101 transmits a request to the communication apparatus 151, and through GATT communication, executes the reading and writing of various types of data stored in a storage area of the communication apparatus 151, data such as the state information, and the like.

The GATT data format will be described next. As illustrated in FIG. 9, the GATT data has a hierarchical structure, and is configured including three elements called "service", "characteristic", and "descriptor". The service, characteristic, and descriptor can be identified by 32-character Universally Unique Identifiers (UUIDs) assigned to each. If a plurality of characteristics are included in a single service, a single UUID is assigned to each characteristic, and information defined by the BLE standard, information defined by a user, and so on are identified. By designating a UUID corresponding to each service and characteristic, the GATT client can execute reads and writes for the value held by each characteristic. Here, the UUID is used as an identifier for uniquely identifying an object through software. The UUID is a 128-bit numerical value, but is normally expressed as a hexadecimal, such as 550e8400-e29b-41d4-a716-446655440000. Note that the service, characteristic, and descriptor include elements defined by the Bluetooth SIG standard, vendor-unique elements, and so on. The UUID of a vendor-unique element is expressed with 32 characters as describe above, but the UUIDs of elements defined by the Bluetooth SIG standard are expressed with four characters. For example, the UUID of an element defined by the Bluetooth SIG standard can be expressed as 2A49, for example.

The service groups attributes in the GATT data by common sections, and one or more characteristics is included in each service. In "characteristic", a single value is set for each characteristic. By using a plurality of characteristics, individual information can be held in each of the characteristics. An attribute value used when additional information is required for the characteristic is set in the descriptor. The descriptor need not be present. The present embodiment assumes that the descriptor is not present in the GATT data constituted by the short-range wireless communication unit 157. Setting values indicating whether or not to permit the GATT client to read and write data can be set as read/write attributes in the service, characteristic, and descriptor, respectively. A byte string, a character string, or the like can be set in the characteristic, and thus, for example, a variety of information corresponding to a specific UUID, such as location information, shop information, image data, and the like, can be set. However, whether or not reading/writing can be executed is based on the read/write attributes set for each service and characteristic.

Flow of Processing

The flow of processing executed by the above-described communication system will be described next. In the following, the flow of processing through which the information processing apparatus 101 detects a communication apparatus 151 located in the periphery and collects information related to that communication apparatus 151 will be described first with reference to FIG. 10, after which several examples of a guide app using that processing will be described.

Figure 10:
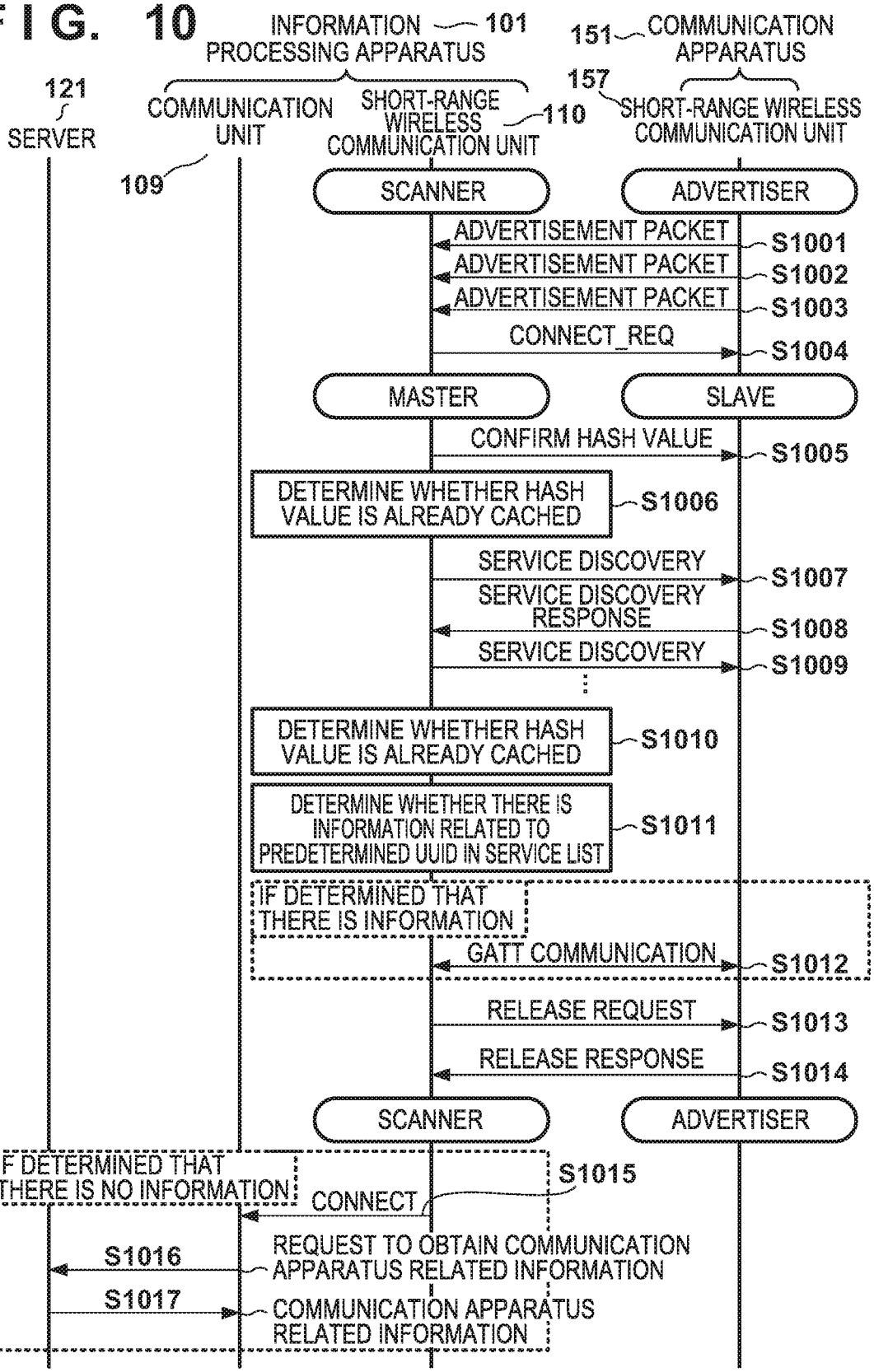
FIG. 10 is a diagram illustrating an example of a method through which an information processing apparatus obtains information of a communication apparatus.

FIG. 10 illustrates an example of the flow of processing executed between the information processing apparatus 101 and the communication apparatus 151 when the information processing apparatus 101 detects the communication apparatus 151 and collects information related to the communication apparatus 151. Of this processing, the processing executed by the communication apparatus 151 is realized by the CPU 154 of the communication apparatus 151 loading a control program stored in a storage device such as the ROM 152 or an HDD (not shown) into the RAM 153 and executing the control program. Likewise, the processing executed by the information processing apparatus 101 is realized by the CPU 103 of the information processing apparatus 101 loading a control program stored in a storage device such as the ROM 104 or an HDD (not shown) into the RAM 105 and executing the control program.

In the processing illustrated in FIG. 10, it is assumed that the communication apparatus 151 functions as the advertiser which transmits the advertising information at a predetermined interval, and the information processing apparatus 101 functions as the scanner that stands by for the advertising information sent from a nearby advertiser. In other words, the short-range wireless communication unit 157 of the communication apparatus 151 outputs the advertising information periodically (S1001 to S1003). At this time, the advertising information is sent as a signal without a designated recipient, for example. The information processing apparatus 101 can recognize the presence of the communication apparatus 151 by the short-range wireless communication unit 110 receiving this advertising information.

Upon recognizing the communication apparatus 151 and determining to connect to the communication apparatus 151, the information processing apparatus 101 transmits the connection request information to the communication apparatus 151. For example, the short-range wireless communication unit 110 transmits, to the short-range wireless communication unit 157, a CONNECT_REQ, which is a request for transitioning to a connection event that establishes a network connection using BLE (step S1004). When the short-range wireless communication unit 157 receives the CONNECT_REQ, the information processing apparatus 101 and the communication apparatus 151 prepare to transition to the connection event. For example, the short-range wireless communication unit 110 and the short-range wireless communication unit 157 notify the CPU 103 and the CPU 154, respectively, that a connection process for GATT communication is to be started. Then, the information processing apparatus 101 and the communication apparatus 151 transition from scanner and advertiser to master and slave, respectively, and the information processing apparatus 101, which is the master, and the communication apparatus 151, which is the slave, establish a connection (BLE connection) for GATT communication. Note that according to the BLE standard, the master can form a one-to-many star-type topology with slaves. The information processing apparatus 101 and the communication apparatus 151 can carry out data communication using a GATT communication method after establishing the BLE connection.

Before accessing GATT data in the communication apparatus 151 through GATT communication, it is necessary for the information processing apparatus 101 to obtain the configuration of the GATT data in the communication apparatus 151. The GATT data configuration obtained here includes, for example, the number of services in the GATT data, the number of characteristics, the values of the respective UUIDs, the attributes indicating whether or not reading is permitted, and so on. The information processing apparatus 101 obtaining the configuration of the GATT data is called "discovery". The information processing apparatus 101 starts the discovery after the BLE connection has been established in step S1004. The information processing apparatus 101 transmits, to the communication apparatus 151, a discovery request for requesting information indicating the configuration of the GATT data in the communication apparatus 151. The communication apparatus 151 transmits information indicating the GATT data configuration to the information processing apparatus 101 as a response to the discovery request. Upon receiving the information indicating the configuration of the GATT data, the information processing apparatus 101 specifies an area where a hash value is stored in the GATT data of the communication apparatus 151, and reads out the hash value (step S1005). Note that the "hash value" is a value stored in a Database Hash characteristic having a characteristic UUID, illustrated in FIG. 9, of 0x2B2A. The communication apparatus 151 stores a hash value calculated by the communication apparatus 151 from the GATT data in advance as the Database Hash characteristic value. In other words, the hash value is a value uniquely specified in accordance with the configuration of the GATT data in the communication apparatus 151.

In the present embodiment, the information processing apparatus 101 stores, in memory such as the ROM 104 or the like, the hash values read out from terminals with which the information processing apparatus 101 has made BLE connections in the past. Upon reading out the hash value in step S1005, the information processing apparatus 101 determines whether that hash value matches any of the hash values read out in past communication (hash values stored in memory) (step S1006). In other words, the information processing apparatus 101 determines whether or not the communication apparatus 151 is a partner apparatus with which the information processing apparatus 101 has made a BLE connection in the past. At this time, the information processing apparatus 101 may use other information in addition to the hash value, including individual identification information such as the MAC address of the communication apparatus 151, as a determination condition.

If it is determined that the hash value obtained in step S1006 is not already stored, the information processing apparatus 101 continues the discovery in order to find the rest of the configuration of the GATT data in the communication apparatus 151. In this case, the information processing apparatus 101 transmits, to the communication apparatus 151, a discovery request for requesting information indicating the configuration of the GATT data in the communication apparatus 151 (step S1007). Upon receiving the discovery request, the communication apparatus 151 transmits information indicating the GATT data configuration to the information processing apparatus 101 (step S1008). Note that the transmission/reception of the discovery request and the transmission/reception of the information indicating the GATT data configuration is repeatedly executed the same number of times as there are services, characteristics, and descriptors in the GATT data. In other words, the information processing apparatus 101 repeatedly transmits the discovery request and receives the information indicating the configuration of the GATT data until all the information indicating the configuration of the GATT data has been transmitted/received (step S1009). Upon receiving all of the information indicating the configuration of the GATT data, the information processing apparatus 101 stores the configuration of the GATT data of the communication apparatus 151 as a cache in memory within the information processing apparatus 101 itself. At this time, the information processing apparatus 101 stores the cache of the configuration of the GATT data of the communication apparatus 151 in the memory in association with the hash value obtained from the communication apparatus 151. Note that the information processing apparatus 101 may store other information in the memory, including individual identification information such as the MAC address of the communication apparatus 151, in an associated form. The information processing apparatus 101 determines whether the process for storing the hash value through this sequence is complete (step S1010), and if the process is not complete, the processing described above is repeated.

Note that if the information processing apparatus 101 determines that the hash value obtained in step S1006 is already stored, the configuration of the GATT data of the communication apparatus 151 is already cached, and thus the processing from steps S1007 to S1010 may be skipped.

The information processing apparatus 101 can execute the desired GATT communication with the communication apparatus 151 after the configuration of the GATT data of the communication apparatus 151 has been obtained. The information processing apparatus 101 determines whether information related to a predetermined UUID is present in a list of services included in the obtained GATT data (step S1011). The predetermined UUID can be a UUID corresponding to information related to the communication apparatus 151. In other words, the information processing apparatus 101 determines whether information corresponding to the related information of the communication apparatus 151 is included in the service list. The service information can be, for example, location information of the communication apparatus 151, shop information, product information, or the like pertaining to a shop in which the communication apparatus 151 is installed, or the like, but is not limited to this information. The information processing apparatus 101 can obtain the information directly from the communication apparatus 151 when there is only a small amount of related information. In this case, the number of times the information processing apparatus 101 accesses the server 121 can be reduced, and the amount of data communicated by the information processing apparatus 101 over the Internet can be reduced as a result. If there is a large amount of related information, the amount may exceed the RAM capacity of the communication apparatus 151, and thus the information processing apparatus 101 may obtain the information using the server 121. If it has been determined that the aforementioned related information in the service list can be obtained from the communication apparatus 151, the information processing apparatus 101 executes any desired GATT communication with the communication apparatus 151 and obtains the related information (step S1012). After the GATT communication is complete, or if it has been determined that the related information cannot be obtained from the communication apparatus 151, the information processing apparatus 101 transmits a release request to the communication apparatus 151 (step S1013). Upon receiving the release request, the communication apparatus 151 transmits a release response (step S1014), and the BLE connection between the information processing apparatus 101 and the communication apparatus 151 is terminated. In response to the BLE connection being terminated, the information processing apparatus 101 and the communication apparatus 151 return to the roles of scanner and advertiser, respectively, and the communication apparatus 151 resumes the transmission of the advertising information.

If it has been determined in step S1011 that information related to the predetermined UUID is not present in the service list included in the obtained GATT data, the information processing apparatus 101 connects to the server 121 over the Internet using the communication unit 109 (step S1015). Then, the information processing apparatus 101 makes a request to the server 121 to obtain the related information of the communication apparatus 151, obtained from the advertising information transmitted by the communication apparatus 151 (step S1016). The server 121 transmits the requested information to the communication unit 109 over the Internet (step S1017). Although the present embodiment describes an example in which the information processing apparatus 101 carries out GATT communication and communication with the server, the configuration is not limited thereto. For example, the information processing apparatus 101 may carry out only one of these types of communication. As described thus far, the information processing apparatus 101 can collect related information for a communication apparatus 151 in the periphery, detected from the advertising information.

First Configuration Example of Guide App

An example of the configuration of a guide app using a communication system such as that mentioned above will be described next. With the guide app according to this example, on the basis of beacons (the advertising information) from a plurality of beacon generating apparatuses (the communication apparatuses 151), the advertising information is received as indicated in steps S1001 to S1003 in FIG. 10, and each beacon generating apparatus is detected. Then, of the detected beacon generating apparatuses, the information processing apparatus 101 specifies a beacon generating apparatus which the guide app should not consider, and sets the guide app to not use the related information of that beacon generating apparatus. According to this configuration, based on the location, orientation, and the like of the information processing apparatus 101, information that should not be displayed at that location, orientation, or the like can be prevented from being displayed in the guide app.

Figure 11:
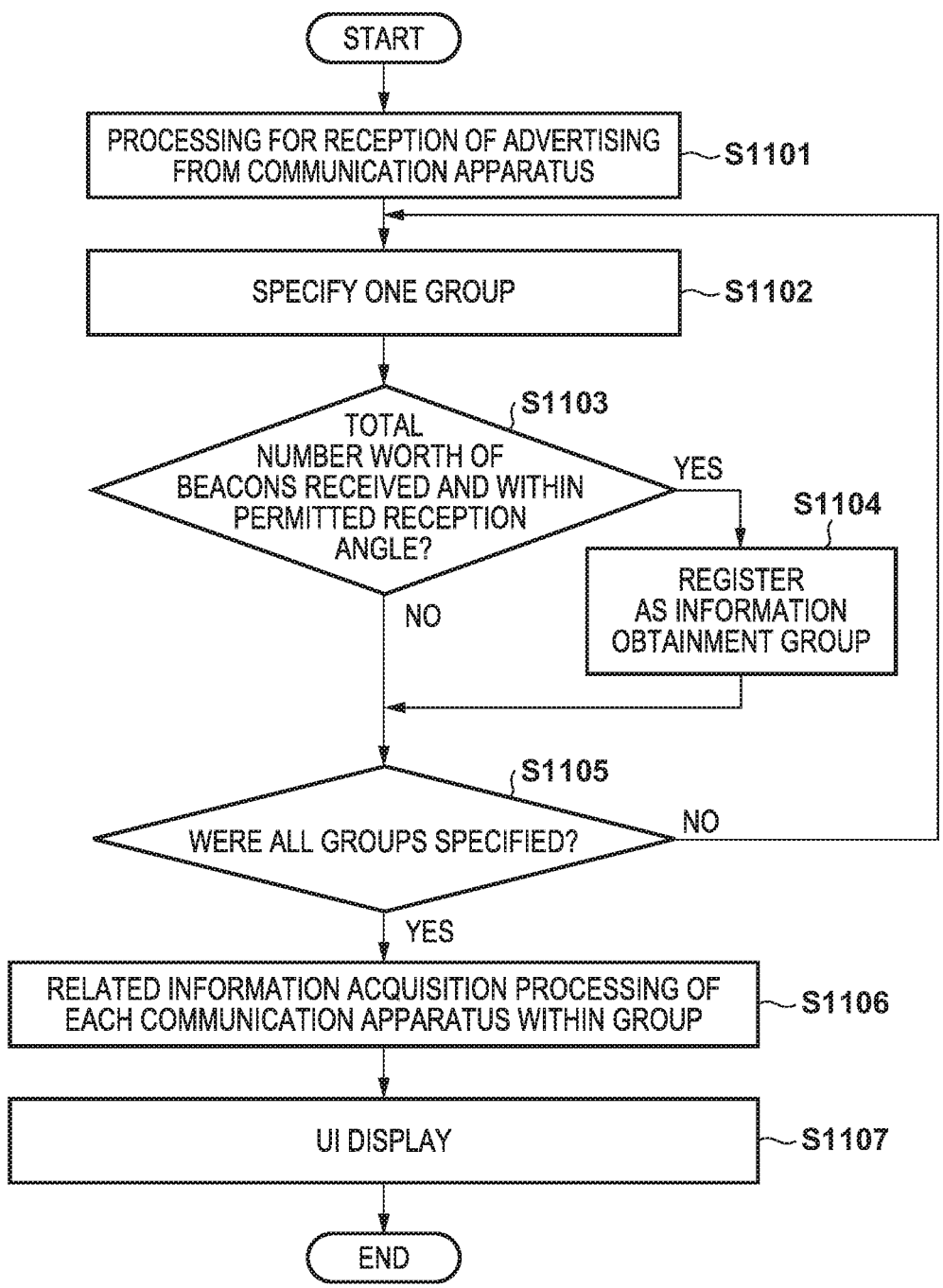
FIG. 11 is a diagram illustrating an example of the flow of processing executed by the information processing apparatus.
Figure 12:
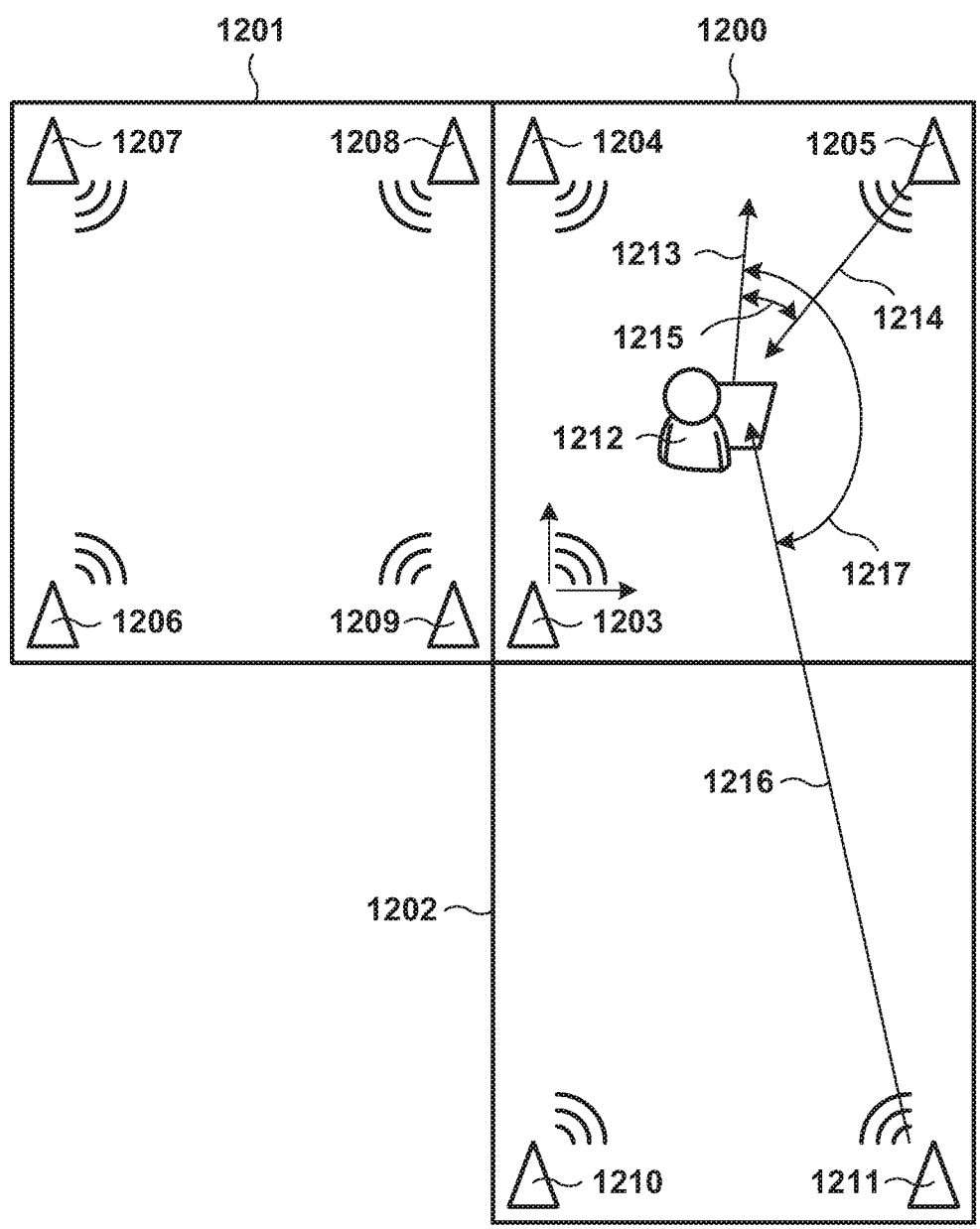
FIG. 12 is a diagram illustrating an example of the arrangement of beacon generating apparatuses.

FIG. 11 illustrates an example of the flow of processing executed by the information processing apparatus 101 with respect to the guide app. This processing is implemented by the CPU 103 loading a control program, the guide app, and so on, which are stored in the ROM 104 or an HDD (not shown) included in the information processing apparatus 101, into the RAM 105 and executing those programs. Additionally, this processing is assumed to be started in response to the guide app being launched in the information processing apparatus 101. As illustrated in FIG. 12, in this example of the processing, it is assumed that the information processing apparatus 101 has entered a location where a plurality of shops (a shop 1200, a shop 1201, and a shop 1202) are present, with a plurality of the beacon generating apparatuses (the communication apparatuses 151) provided in the respective shops. The beacon generating apparatuses will be called "beacons" hereinafter. It is assumed that beacons 1203 to 1205 are provided in the shop 1200, beacons 1206 to 1209 are provided in the shop 1201, and beacons 1210 and 1211 are provided in the shop 1202. The beacons can send the advertising information only within a specific range. As such, to receive the advertising information from each beacon, it is necessary for the information processing apparatus 101 to be within the aforementioned predetermined range corresponding to that beacon. In one example, the beacon 1203, the beacon 1204, and the beacon 1205 can send the advertising information within a range of ±45° from a straight line connecting the location of the beacon with the center of the shop 1200 (a range that is a total of 90°). Likewise, the beacon 1206, the beacon 1207, the beacon 1208, and the beacon 1209 can send the advertising information within a range of ±45° from a straight line connecting the location of the beacon with the center of the shop 1201 (a range that is a total of 90°). Furthermore, the beacon 1210 and the beacon 1211 can send the advertising information within a range of ±45° from a straight line connecting the location of the beacon with the center of the shop 1202 (a range that is a total of 90°.

The information processing apparatus 101 obtains the advertising information sent from the plurality of communication apparatuses 151 (step S1101). In this example, as illustrated in FIG. 12, it is assumed that a user 1212 and the information processing apparatus 101 are located within the shop 1200, and the user 1212 is facing in a direction 1213 (substantially directly toward the beacon 1205) while holding the information processing apparatus 101 in front of his or her body. It is also assumed, as illustrated in FIG. 12, that in this state, the information processing apparatus 101 receives advertising information 1214 from the beacon 1205 and advertising information 1216 from the beacon 1211. Although not illustrated here, the information processing apparatus 101 can receive advertising information from the beacon 1203 and the beacon 1204 as well. The information processing apparatus 101 estimates the direction in which the beacon is installed using short-range wireless communication. Note that the method for estimating the direction is as described above, and the information processing apparatus 101 can estimate an arrival direction by the short-range wireless communication unit 110 using a plurality of antennas, for example. Additionally, the information processing apparatus 101 can obtain information of the location and angle of radiation of each beacon from the beacon, another device such as a server, or the like. In the example illustrated in FIG. 12, it is assumed that the advertising information 1214 enters at an angle 1215, and the advertising information 1216 enters at an angle 1217, using the direction 1213 as a base point.

Figures 13, 14:
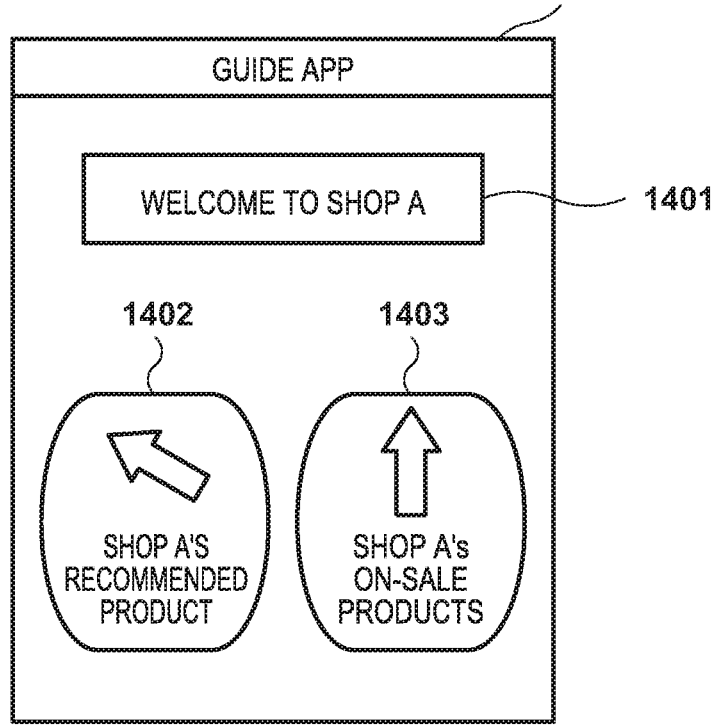
FIG. 13 is a diagram illustrating an example of the configuration of an advertisement list.
FIG. 14 is a diagram illustrating an example of a UI display in a guide app.

FIG. 13 illustrates an example of the advertising information received by the information processing apparatus 101 in step S1101 in the environment illustrated in FIG. 12. Note that a list such as that illustrated in FIG. 13 will be called an advertisement list 1300 hereinafter. In this example, a "beacon name" is included in a "device name", while a "group", "total number", and "permitted reception angle" are included in "communication apparatus identification information", within the advertising information. However, this is merely an example, and another information configuration may be used instead. The advertising information may also include only one of the aforementioned types of information. "Beacon name" stores information for identifying each detected beacon (from which advertising information has been received by the information processing apparatus 101). Note that information aside from the beacon name but which enables the beacon to be identified may be used instead. For example, an identifier that uniquely identifies the beacon, such as a UUID, may be used instead of the beacon name. Based on the beacon directionality, in FIG. 12, the information processing apparatus 101 is not located within the sending range of the beacon 1208 and the beacon 1209. Accordingly, the information of the beacon 1208 and the beacon 1209 is not included in the advertisement list 1300 illustrated in FIG. 13.

"Group" is information indicating one or more groups, in the case where a beacon is classified into such groups. The information in "group" is used to confirm whether a given beacon and a different beacon belong to the same group. For example, in the advertisement list 1300, the beacon 1203, the beacon 1204, and the beacon 1205 belong to group A, which indicates that those beacons belong to the same group. "Total number" indicates the total number of beacons belonging to the same group. For example, in the advertisement list 1300, the total number for group A is "3", which indicates that three beacons are included in the group A. From the information in this advertisement list 1300, it is specified that the information processing apparatus 101 is receiving the advertising information from all of the three beacons 1203 to 1205 present in the group A. The "permitted reception angle" is information used in order to confirm whether the reception direction of the advertisement received by the information processing apparatus 101 held by the user 1212 is within a "permitted reception angle". Taking a situation where the information processing apparatus 101 is facing directly toward a beacon as a center, the extent to which the information processing apparatus 101 is permitted to face in a direction shifted from that center is used as the permitted reception angle. In other words, using the direction in which the information processing apparatus 101 is facing as a reference, an angular range in which the advertising information received from each beacon should be received is set as the permitted reception angle, and the reception of advertising information outside of this angular range is not permitted. The permitted reception angle is set individually for each beacon. Note that the permitted reception angle may be the same among beacons. If the information processing apparatus 101 has received advertising information from a beacon outside the range indicated by the permitted reception angle, the information processing apparatus 101 is not permitted to use the information pertaining to that beacon. For example, with a beacon having an extremely narrow permitted reception angle, is necessary for that beacon and the information processing apparatus 101 to be substantially opposite each other in order for the related information of that beacon to be used. On the other hand, with a beacon having a permitted reception angle of 360°, the information processing apparatus 101 can use the related information of that beacon regardless of the direction in which the information processing apparatus 101 is facing. For example, by receiving the advertising information as indicated by steps S1001 to the S1003 in FIG. 10, the information processing apparatus 101 can obtain the information of each beacon. Note that the information processing apparatus 101 may, for example, obtain shop information of the shop where the beacon is installed from the advertising information, and then carry out a grouping process based on that shop information. In other words, the information processing apparatus 101 may obtain information directly indicating the respective elements included in the advertisement list 1300 from the advertising information, or may derive the values of the respective elements on the basis of information obtained from the advertising information.

Once the advertisement list 1300 has been created in step S1101, the information processing apparatus 101 executes the processing described below for each group on the basis of "group" in the advertisement list 1300. To that end, the information processing apparatus 101 specifies a group, among the plurality of groups specified by the advertisement list 1300, to be subject to a determination in step S1103 (step S1102). A group that has already been specified as a group to be subject to the determination in step S1103 is of course not specified at this time. Next, in step S1103, the information processing apparatus 101 determines whether or not the "total number" of the group specified in step S1102 matches the actual number of beacons detected among the beacons belonging to that group. Then, the information processing apparatus 101 determines whether all the advertising information transmitted from the beacons belonging to the group specified in step S1102, and actually detected by the information processing apparatus 101, is within the range of the "permitted reception angle" in the advertisement list 1300. If a determination of "YES" is made for the aforementioned two determinations (YES in step S1103), the information processing apparatus 101 registers the group specified in step S1102 in the RAM 105 as an information obtainment group (step S1104), and the sequence then moves to step S1105. On the other hand, if a determination of "NO" is made in at least one of the aforementioned two determinations (NO in step S1103), the sequence moves to step S1105 without the information processing apparatus 101 registering the group specified in step S1102 as an information obtainment group.

In the advertisement list 1300 illustrated in FIG. 13, the "total number" of group B is 4. However, as indicated by the advertisement list 1300, only two of the beacons belonging to group B (the beacon 1206 and the beacon 1207) have actually been detected. Accordingly, the information processing apparatus 101 does not execute the subsequent processing for the beacons belonging to group B. Although all of the beacons in group C are listed in the advertisement list 1300, the reception direction of the advertising information received from those beacons is not within the permitted reception angle (180°). In other words, as indicated by the advertisement list 1300, the permitted reception angle of the beacons in group C is 180°, but the direction from which the advertising information from those beacons has been received is not within a range of 90° to the left and right relative to the direction 1213 (a total of 180°). For example, the advertising information 1216 transmitted from the beacon 1211 enters at the angle 1217, which is not within a range of 90° from the direction 1213. As such, the subsequent processing is not executed for the beacons belonging to group C. On the other hand, all of the beacons in group A are listed in the advertisement list 1300, and the reception direction of the advertising information received from those beacons is within the permitted reception angle. In other words, as indicated by the advertisement list 1300, of the beacons in group A, the beacon 1203 has a permitted reception angle of 360°, and the reception direction of the advertising information received from the beacon 1203 is therefore clearly within the permitted reception angle. On the other hand, although the beacon 1204 and the beacon 1205 have a permitted reception angle of 180°, the advertising information from those beacons is received by the information processing apparatus 101 within a range of 90° to the left and right relative to the direction 1213 (a total of 180°). For example, the advertising information 1214 transmitted from the beacon 1205 enters at the angle 1215, which is within a range of 90° from the direction 1213. The information processing apparatus 101 therefore registers group A as an information obtainment group.

In step S1105, the information processing apparatus 101 determines whether all the groups specified by the advertisement list 1300 have been specified in step S1102 (i.e., whether the determination of step S1103 has been made for all the groups). If the information processing apparatus 101 makes a determination of "NO", the sequence returns to step S1102, where a group not yet specified is newly specified and the determination of step S1103 is carried out for the specified group. On the other hand, if the information processing apparatus 101 makes a determination of "YES", the sequence moves to step S1106.

In step S1106, the information processing apparatus 101 obtains the related information for each beacon included in the information obtainment group. If, at this time, each beacon included in the information obtainment group is transmitting the same advertising information, the information processing apparatus 101 may obtain the related information from only one of the beacons. The information processing apparatus 101 executes the processing of steps S1005 and on in FIG. 10 for each beacon included in a group specified as an information obtainment group, for example. The information processing apparatus 101 may obtain the related information of each beacon (communication apparatus 151) from that beacon through step S1011, or may obtain the related information of each beacon from an external device such as the server 121 through step S1017, for example. The information processing apparatus 101 then displays a UI on the basis of the related information of each beacon obtained in step S1106 (step S1107). Note that the information processing apparatus 101 does not execute the processing of steps S1005 and on in FIG. 10 for each beacon included in a group not specified as an information obtainment group. As such, a UI display based on the related information of each beacon included in a group not specified as an information obtainment group is not executed. FIG. 14 illustrates an example of a screen 1400 of the guide app, displayed in the display unit 108. In this example, the information processing apparatus 101 can obtain content showing the name of the shop and a welcome message as the related information for the beacon 1203, for example. The information processing apparatus 101 can then display that information in an area 1401 of the screen 1400. Additionally, the information processing apparatus 101 can obtain information indicating that a recommended product is present near the beacon 1204, as the related information of the beacon 1204, for example. Then, on the basis of the presence of the recommended product and the direction 1213 in which the information processing apparatus 101 is facing, the information processing apparatus 101 can display a button 1402 including an arrow pointing in the direction of the beacon 1204, which is the direction in which that recommended product is present. Note that the information processing apparatus 101 may obtain text to be displayed in the button 1402 as the related information of the beacon 1204, and display that text in the button 1402. Note that the direction of the beacon 1204 can be estimated through AoA/AoD estimation as described above. Additionally, the information processing apparatus 101 can obtain information indicating behavior for when the button 1402 has been pressed, as the related information of the beacon 1204. In one example, the behavior for when the button 1402 has been pressed can be launching a browser and displaying/playing back content located at a predetermined URL (e.g., a page introducing the recommended product, a page showing the specific location where the recommended product is located in the shop, or the like). However, the behavior is not limited thereto, and for example, a process for transmitting a command that controls lighting in the vicinity of a recommended product to turn on and off, so as to illuminate the location of the recommended product in the shop, may be executed as the behavior for when the button 1402 has been pressed. Additionally, a process for displaying a screen in the information processing apparatus 101 for providing a notification that such an illumination control process is being executed may be carried out as the behavior for when the button 1402 has been pressed.

Like the button 1402, a display based on the related information of the beacon 1205 is made in a button 1403. The information processing apparatus 101 obtains information indicating that an item on sale is present in a location near the beacon 1205, or information of text to be displayed in the button 1403, as the related information of the beacon 1205. Then, on the basis of the presence of the product on sale and the direction 1213 in which the information processing apparatus 101 is facing, the information processing apparatus 101 can display the button 1403 including an arrow pointing in the direction of the beacon 1205, which is the direction in which that product on sale is present. Note that the direction of the beacon 1205 can be estimated through AoA/AoD estimation as described above. Additionally, the information processing apparatus 101 can also obtain information indicating behavior for when the button 1403 has been pressed, as the related information of the beacon 1205.

As described thus far, when beacon generating apparatuses (the communication apparatuses 151) have been detected in the periphery, the information processing apparatus 101 determines from which of those beacon generating apparatuses to obtain the related information. In other words, the beacon generating apparatuses being divided into groups, and the information processing apparatus 101 receiving the advertising information from all the beacon generating apparatuses in the group, is taken as a first condition for obtaining the related information of the beacon generating apparatuses in that group. The advertising information from all of the beacon generating apparatuses in a group arriving within a predetermined angular range determined for each beacon generating apparatus, using the direction in which the information processing apparatus 101 is facing as a reference, is taken as a second condition for the information processing apparatus 101 obtaining the related information. Accordingly, the related information will no longer be obtained for an unnecessarily high number of beacon generating apparatuses, and the information processing apparatus 101 can be prevented from carrying out unnecessary GATT communication, needlessly connecting to the Internet, and so on. Not carrying out such unnecessary communication makes it possible to prevent communication costs from soaring, and furthermore makes it possible to shorten the processing time in a predetermined application that uses the related information, such as the guide app.

Although the information processing apparatus 101 functions so as to obtain the related information for beacon generating apparatuses included in a group that satisfies both the first condition and the second condition in the above example, the configuration is not limited thereto. In other words, the information processing apparatus 101 may obtain the related information of beacon generating apparatuses included in a group satisfying only the first condition, or obtain the related information of beacon generating apparatuses included in a group satisfying only the second condition, for example. Additionally, in the above-described first condition, the advertising information being received from all of the beacon generating apparatuses within a group may be replaced with the advertising information being received from greater than or equal to a predetermined percentage or a predetermined number of beacon generating apparatuses within a group. Although the foregoing example describes a configuration where the predetermined percentage is 10 percent (or the predetermined number is the same as the "total number"), the configuration is not limited thereto, and the predetermined percentage, the predetermined number, and so on may be any desired values. Likewise, the above-described second condition may be replaced with the arrival direction of the advertising information from greater than or equal to a specific percentage (or number) of the beacon generating apparatuses in a group being within a permitted reception angle. Additionally, although the foregoing example describes a configuration where the specific percentage is 10 percent (or the specific number is the same as the "total number"), the configuration is not limited thereto, and the specific percentage, the specific number, and so on may be any desired values. Note that the predetermined percentage and the specific percentage (the predetermined value and the specific value) may be the same, or the specific percentage may be lower than the predetermined percentage (the specific value may be lower than the predetermined value).

Note that in the guide app, display areas corresponding to a plurality of directions may be prepared, and a display area based on the direction from which advertising information has been received may be used to display information based on the related information of a beacon generating apparatus predicted to be present in that direction. For example, the plurality of display areas can be set so that the direction in which the information processing apparatus 101 is facing is associated with an area at the top of the screen, the directions to the left and right of that direction are associated with the left and right sides of the screen, in the direction opposite from that direction is associated with the bottom of the screen. Note that a plurality of display area templates, based on the number of beacon generating apparatuses from which it has been determined that information should be obtained, the locations of the beacon generating apparatuses, and so on, may be prepared, and the guide app may generate the display screen by selecting one of the templates. Accordingly, the direction of the beacon generating apparatus corresponding to the displayed information is associated with an area on the screen, which makes it possible for the user to easily recognize to which direction the displayed information is related. Additionally, if the related information includes information indicating behavior to be carried out when the related information is selected, the guide app may make a display using the button format illustrated in FIG. 14, whereas if information indicating the behavior is not included, the display may be made in a non-button format.

Second Configuration Example of Guide App

Another example of the configuration of a guide app using a communication system such as that mentioned above will be described next. The guide app according to this configuration example specifies an order in which to obtain the related information (detailed information) of the beacons when, for example, a traffic line, such as a recommended movement path within a shop, is to be presented to a user. This order is set by the party that installs/operates the beacons, for example, and is determined by the order of nearby beacons when moving along the traffic line, for example.

Figure 15B:
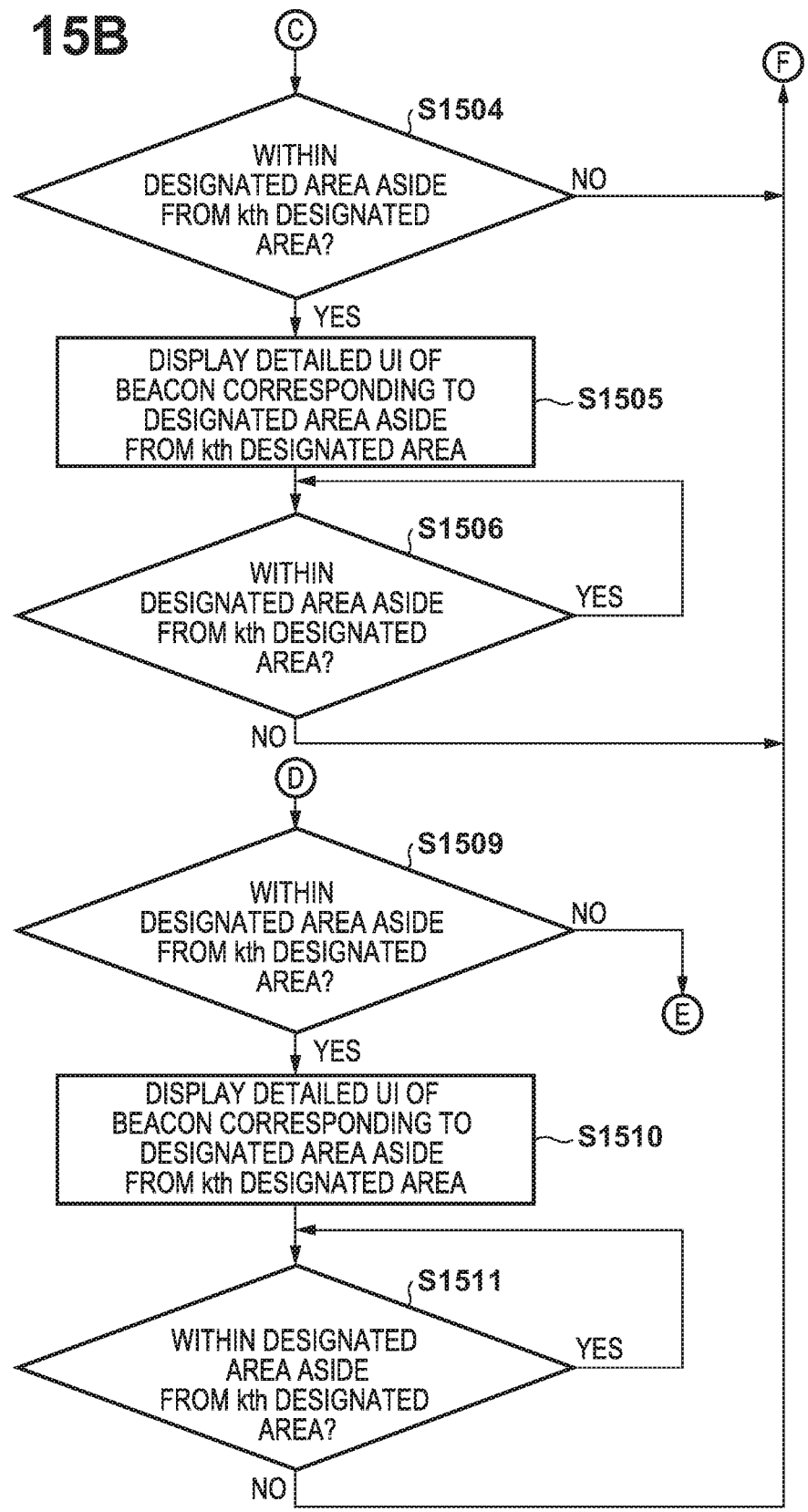
Figure 16A:
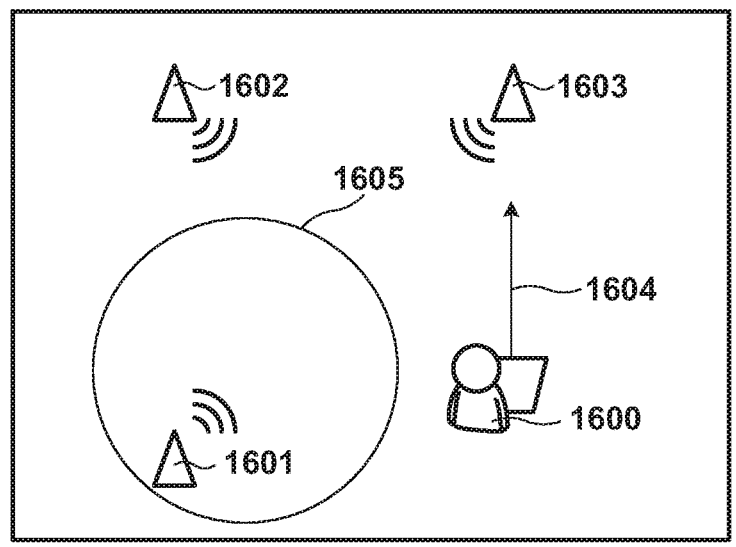
FIGS. 16A to 16C are diagrams illustrating an example of the arrangement of beacon generating apparatuses.
Figure 17:
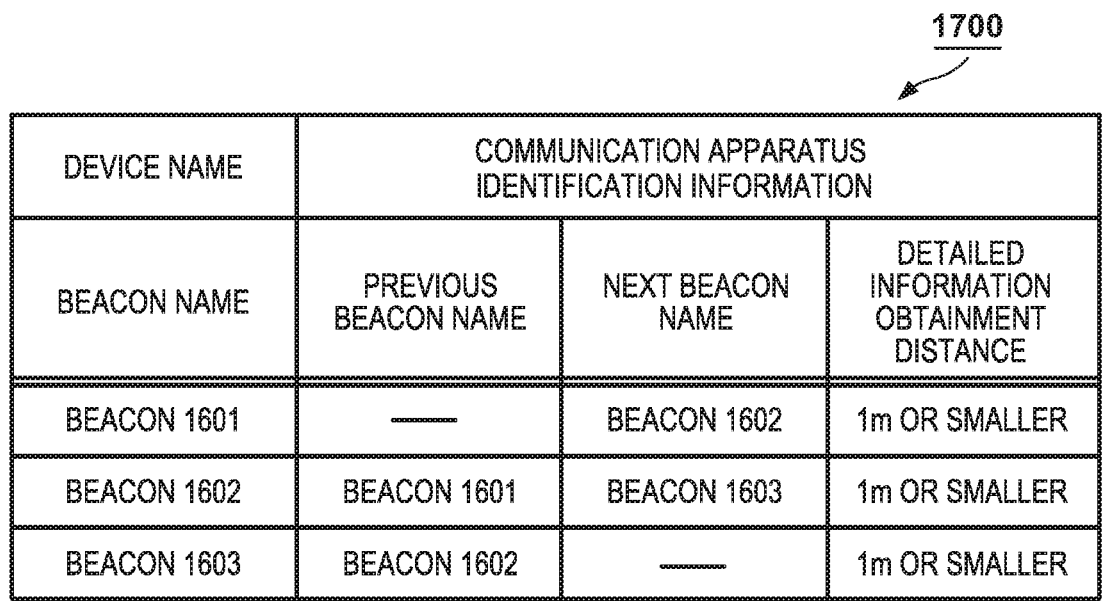
FIG. 17 is a diagram illustrating an example of the configuration of an advertisement list.

FIGS. 15A and 15B illustrate an example of the flow of processing executed by the information processing apparatus 101 in this configuration example. This processing is implemented by the CPU 103 loading a control program, the guide app, and so on, which are stored in the ROM 104 or an HDD (not shown) included in the information processing apparatus 101, into the RAM 105 and executing those programs. Additionally, this processing is assumed to be started in response to the guide app being launched in the information processing apparatus 101. In the processing illustrated in FIGS. 15A and 15B, the information processing apparatus 101 obtains the advertising information sent from a plurality of beacon generating apparatuses (called "beacons" hereinafter) (step S1501). In this example, initially, a positional relationship between a user 1600 who holds the information processing apparatus 101 and beacons 1601 to 1603 is assumed to be a state such as that illustrated in FIG. 16A. Here, the user 1600 is assumed to be facing in a direction 1604, directly toward the beacon 1603, while holding the information processing apparatus 101 in front of his or her body. In step S1501, the information processing apparatus 101 is receiving the advertising information sent from each of the beacons. In this example, the information processing apparatus 101 creates an advertisement list 1700, such as that illustrated in FIG. 17, on the basis of the advertising information received from the beacons in step S1501.

In the advertisement list 1700, "beacon name" is included in the "device name", whereas "previous beacon name", "next beacon name", and "detailed information obtainment distance" are included in the "communication apparatus identification information". However, these are merely examples, and only some of this information (e.g., any one type) may be included in the advertisement list 1700. Other information may also be included in the advertisement list 1700. The same details as those described with reference to the advertisement list 1300 illustrated in FIG. 13 are stored in the "beacon name". Information indicating the order of the beacons is stored in "previous beacon name" and "next beacon name". Information indicating this order will be called "order information" hereinafter. A beacon that is kth in the order specified on the basis of the order information will be called a "kth beacon". In the example of the advertisement list 1700, it can be seen, by referring to the information for the beacon 1602, that the beacon before the beacon 1602 in the order is the beacon 1601, and the beacon after the beacon 1602 in the order is the beacon 1603. In other words, the first beacon in the order is the beacon 1601. The beacon 1602 is the next beacon relative to the first beacon, and is therefore a second beacon in the order. The beacon 1603 is the next beacon relative to the second beacon, and is therefore a third, and final, beacon in the order. Note that the order information need not specify the order of the beacons by indicating that a beacon is previous or next in the order relative to a given beacon, as with the "previous beacon name" and the "next beacon name". For example, the order information may be information that simply indicates a number corresponding to the order of the beacon (e.g., "k", for the kth beacon). The "detailed information obtainment distance" stores a value for defining a designated area, which will be described later. When a distance between the information processing apparatus 101 and a beacon is less than or equal to the value stored in the detailed information obtainment distance, the information processing apparatus 101 is considered to be located within the designated area. Note that the detailed information obtainment distance is a predetermined distance shorter than the distance from the beacon at which the information processing apparatus 101 can receive (detect) the advertising information. In other words, the designated area is an area smaller than the range at which the information processing apparatus 101 can receive (detect) the advertising information. The detailed information obtainment distance is defined for each beacon individually. The detailed information obtainment distance may be the same among the beacons. The distance between the information processing apparatus 101 and the beacon can be measured using a past distance measurement method based on the BLE standard, using the signal transmission power and a reception signal strength indicator (RSSI).

The information processing apparatus 101 receives the advertising information from each of the beacons and creates the advertisement list 1700, and the sequence then moves to step S1502. In step S1502, the information processing apparatus 101 sets an "information obtainment beacon", which is a beacon from which information is to be obtained. In step S1502, the information processing apparatus 101 sets the kth beacon as the information obtainment beacon. The value of k is incremented each time step S1502 is carried out, starting from 1.

In step S1503, the information processing apparatus 101 determines whether or not the advertising information is being received from an information obtainment beacon from which it has been determined that it is necessary to obtain the information to make the UI display. Note that which beacon is the information obtainment beacon is specified on the basis of order information included in each piece of received advertising information. The information processing apparatus 101 moves the sequence to step S1507 if a determination of "YES" is made, and to step S1504 if a determination of "NO" is made.

Figure 16B:
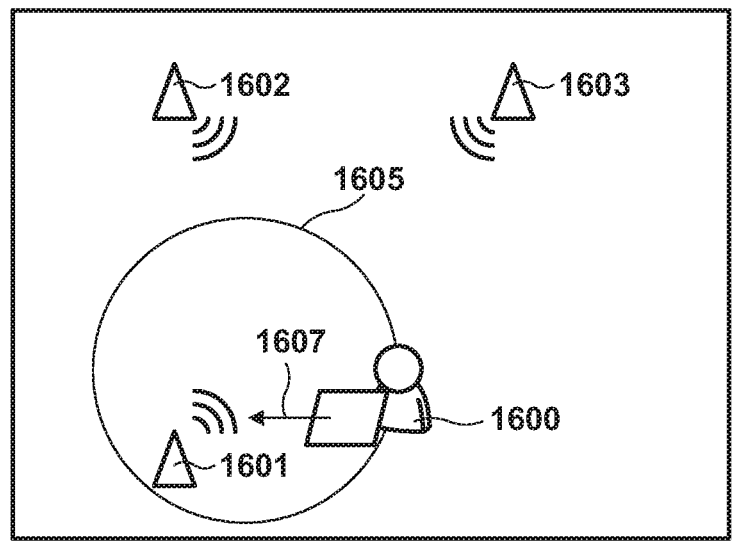
Figure 16C:
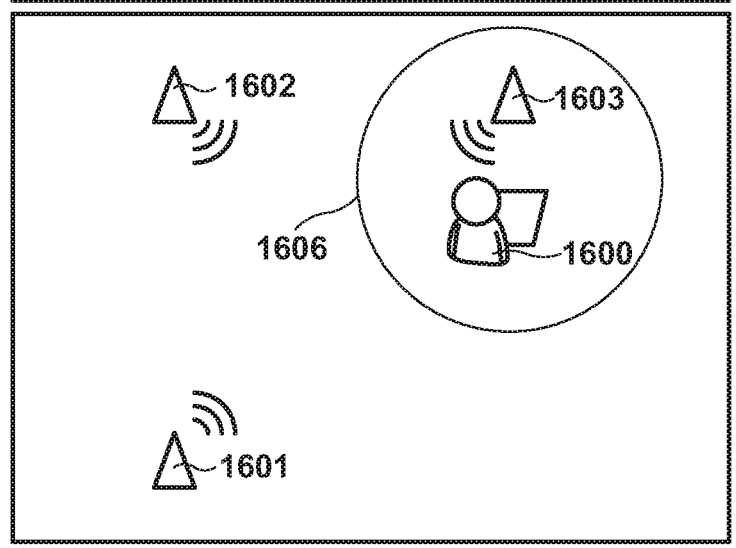

In step S1504, which is executed when a determination of "NO" is made in step S1503, the information processing apparatus 101 determines whether or not the information processing apparatus 101 is located in a designated area aside from a kth designated area. Note that the "designated area" is an area designated as an area in the periphery of each beacon, and an area in the periphery of the kth beacon is assumed to be the kth designated area. For example, in FIGS. 16A to 16C, the designated area corresponding to the beacon 1601 is an area 1605, and the designated area corresponding to the beacon 1603 is an area 1606. Note that this determination is carried out on the basis of a distance between the information processing apparatus 101 and a beacon aside from the kth beacon, specified on the basis of the advertising information received from the beacon aside from the kth beacon (sent from the beacon aside from the kth beacon). If the distance between the information processing apparatus 101 and the beacon aside from the kth beacon is less than or equal to a predetermined threshold, the information processing apparatus 101 is determined to be located in a designated area aside from the kth designated area. However, if the distance between the information processing apparatus 101 and the beacon aside from the kth beacon is greater than the predetermined threshold, the information processing apparatus 101 is determined to not be located in a designated area aside from the kth designated area. The predetermined threshold is, for example, a value stored in the "detailed information obtainment distance" included in the advertising information received from the beacon aside from the kth beacon. In other words, in this determination, the information processing apparatus 101 determines whether or not the user should be guided to the kth beacon but is instead located in the periphery of a beacon aside from the kth beacon. The information processing apparatus 101 moves the sequence to step S1505 if a determination of "YES" is made, and returns the sequence to step S1503 if a determination of "NO" is made.

Figure 18A:
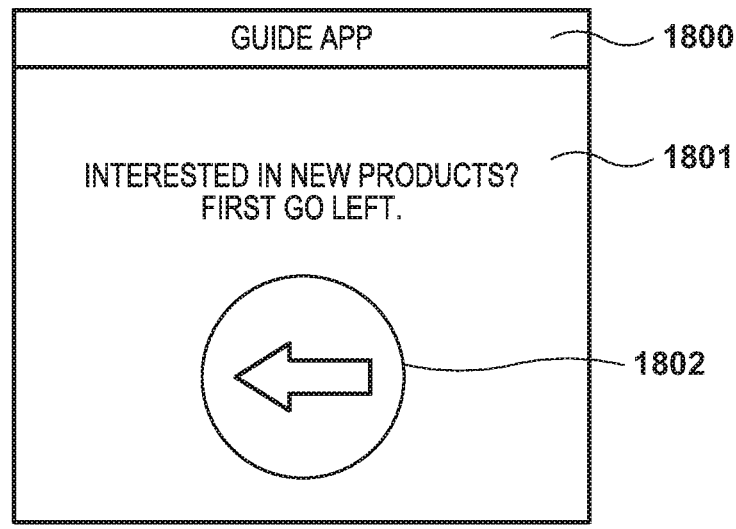
FIGS. 18A to 18C are diagrams illustrating an example of a UI display in a guide app.
Figure 18B:
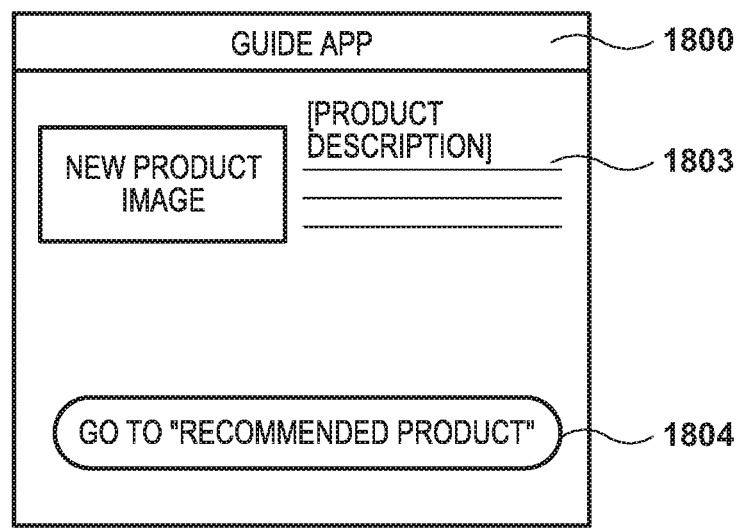
Figure 18C:
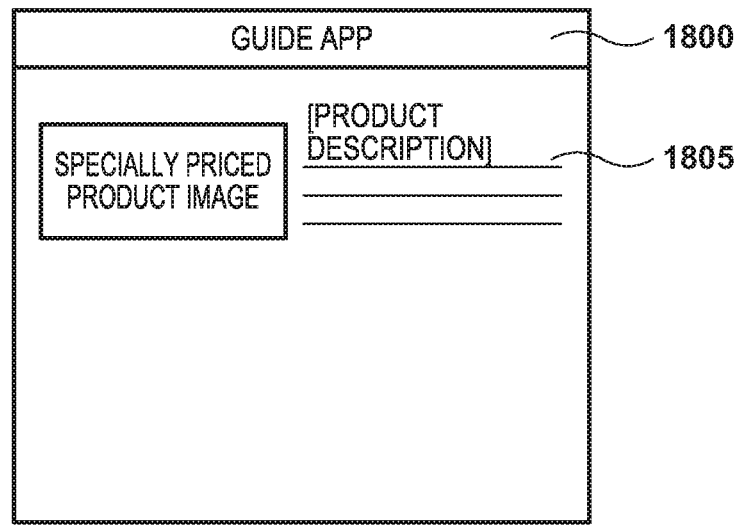

In step S1505, which is executed when a determination of "YES" is made in step S1504, the information processing apparatus 101 displays a detailed screen for the beacon corresponding to the designated area where the user is located (e.g., FIG. 18C). Detailed information 1803 including images of products on display in the periphery of the location of the beacon, text describing those products, and so on is displayed in a detailed screen 1800 illustrated in FIG. 18C. Note that the information processing apparatus 101 may display the detailed screen 1800 on the basis of screen information already included in the guide app, for example. Additionally, the information processing apparatus 101 may obtain screen information corresponding to the beacon corresponding to the designated area in which the information processing apparatus 101 is currently located from a server on the Internet, and display the detailed screen 1800 on the basis of that screen information, for example. Furthermore, the information processing apparatus 101 may use BLE to request screen information from the beacon corresponding to the designated area in which the information processing apparatus 101 is currently located, and display the detailed screen 1800 on the basis of that screen information, for example. In this manner, according to the present embodiment, the detailed screen 1800 corresponding to a beacon aside from the kth beacon can be displayed when the user is unexpectedly located in a designated area corresponding to the beacon aside from the kth beacon. However, the embodiment is not limited to this configuration, and it is also possible to not display the detailed screen 1800 corresponding to a beacon aside from the kth beacon even when the user is unexpectedly located in a designated area corresponding to the beacon aside from the kth beacon, for example. In other words, a configuration may be employed in which the detailed screen is displayed only when the user is located in the designated area corresponding to the kth beacon.

Next, in step S1506, the information processing apparatus 101 determines whether or not the information processing apparatus 101 is still located in the designated area where the user was located. This determination is also executed on the basis of a distance between the information processing apparatus 101 and a beacon specified on the basis of the advertising information received from the beacon corresponding to the designated area where the user was located. The information processing apparatus 101 repeats the determination of step S1506 if a determination of "YES" is made, and returns the sequence to step S1503 if a determination of "NO" is made.

In step S1507, which is executed when a determination of "YES" is made in step S1503, the information processing apparatus 101 displays a guidance screen for guiding the user to the kth beacon (e.g., FIG. 18A). In the detailed screen 1800 illustrated in FIG. 18A, information 1801, indicating that a new product is present in the periphery of the kth beacon, indicating the direction in which the kth beacon is located, and so on is displayed. Note that the direction in which the kth beacon is located can be estimated through AoA/AoD estimation as described above. Additionally, an icon 1802 indicating the direction in which the kth beacon is located is displayed in the detailed screen 1800. Note that the content of the information 1801, the icon 1802, and so on can be changed on the basis of a location of the user after moving, advertising information received after moving, and so on. According to this configuration, the guide app can present, to the user, an indication that a new product is present in the direction of the kth beacon, and can provide guidance thereafter in accordance with the user's movement. Thus according to the present embodiment, when the advertising information is being received from a plurality of beacons, the information processing apparatus 101 uses the advertising information received from a specific beacon based on the order information, and does not use the other advertising information. Specifically, the information processing apparatus 101 executes a process for guiding the user to the specific beacon based on the order information, but does not execute a process for guiding the user to other beacons. Accordingly, even when advertising information is being received from a plurality of beacons, the information processing apparatus 101 can use only the appropriate advertising information based on the circumstances.

Next, in step S1508, the information processing apparatus 101 determines whether or not the information processing apparatus 101 is located in the kth designated area. Note that this determination is carried out on the basis of a distance between the information processing apparatus 101 and the kth beacon, specified on the basis of the advertising information received from the kth beacon (sent from the kth beacon). In other words, in this determination, the information processing apparatus 101 determines whether or not the user has moved to the periphery of the kth beacon by being guided to the kth beacon. The information processing apparatus 101 moves the sequence to step S1512 if a determination of "YES" is made, and to step S1509 if a determination of "NO" is made.

In step S1509, which is executed when a determination of "NO" is made in step S1508, the information processing apparatus 101 determines whether or not the information processing apparatus 101 is located in a designated area aside from a kth designated area. This process is the same as the process of step S1504. The information processing apparatus 101 moves the sequence to step S1510 if a determination of "YES" is made, and returns the sequence to step S1508 if a determination of "NO" is made.

In step S1510, which is executed when a determination of "YES" is made in step S1509, the information processing apparatus 101 displays a detailed screen for the beacon corresponding to the designated area where the user is located (e.g., FIG. 18B). This process is the same as the process of step S1505.

Next, in step S1511, the information processing apparatus 101 determines whether or not the information processing apparatus 101 is still located in the designated area where the user was located. This process is the same as the process of step S1506. The information processing apparatus 101 repeats step S1511 if a determination of "YES" is made, and moves the sequence to step S1503 if a determination of "NO" is made.

In step S1512, which is executed when a determination of "YES" is made in step S1508, the information processing apparatus 101 displays a detailed screen for the beacon corresponding to the kth designated area (e.g., FIG. 18B). Note that a button 1804 for guiding the user to the next beacon after the kth beacon (a k+1th beacon) is displayed in the detailed screen 1800.

Next, in step S1513, the information processing apparatus 101 determines whether or not the information processing apparatus 101 is still located in the kth designated area where the user was located. This process is the same as the process of step S1506. The information processing apparatus 101 moves the sequence to step S1514 if a determination of "YES" is made, and returns the sequence to step S1507 if a determination of "NO" is made.

Next, in step S1514, the information processing apparatus 101 determines whether or not the value of k is kmax, which is a value corresponding to the final place in the order. If a determination of "YES" is made, the information processing apparatus 101 considers the user as having been guided to all of the beacons, and ends the processing, whereas if a determination of "NO" is made, the sequence moves to step S1515.

Next, in step S1515, the information processing apparatus 101 determines whether or not a user operation has been made through the button 1804. If a determination of "YES" is made, the information processing apparatus 101 moves the sequence to step S1516, increments the value of k, and repeats the sequence from step S1502. On the other hand, if a determination of "NO" is made, the information processing apparatus 101 returns the sequence to step S1513.

Note that the information processing apparatus 101 can execute a process for ensuring that the same detailed information is not obtained twice, such as setting the detailed information obtainment distance for an information obtainment beacon 1 (the beacon 1601) to 0 after obtaining the detailed information for the information obtainment beacon 1. This makes it possible to prevent the information processing apparatus 101 from needlessly obtaining the detailed information of the information obtainment beacon 1 multiple times.

Note that the information processing apparatus 101 need not display the detailed screen 1800 if the user is already located in the designated area corresponding to the beacon to which he or she has been guided. For example, in the determinations of step S1504 and the like, the information processing apparatus 101 need not treat the designated area corresponding to a beacon to which the user has already been guided as a designated area aside from the kth designated area.

Note also that processing such as that illustrated in FIGS. 15A and 15B may be executed under the condition that all, or a number greater than or equal to a predetermined percentage, of the beacons in a group of beacons to which the user is to be guided have been detected by the information processing apparatus 101. The condition that each of the beacons in the group is being received within a range corresponding to the permitted reception angle, as described in the first configuration example, may be added as well. In this case, the beacons in this group correspond to the "group" described in the first configuration example. This configuration makes it possible to prevent a situation where, for example, the information processing apparatus 101 is located in one of two adjacent shops, and detects a start beacon from the adjacent shop, resulting in information different from the information of the shop where the apparatus is currently located being communicated to the user. In other words, when only the first beacon is detected for a group corresponding to the adjacent shop, the information processing apparatus 101 does not execute the processing of FIGS. 15A and 15B for that first beacon. On the other hand, it is assumed that the information processing apparatus 101 can detect almost all or all of the beacons within a group corresponding to at least part of the shop where the apparatus is currently located. As such, the information processing apparatus 101 executes the processing of FIGS. 15A and 15B for beacons of the shop where the apparatus is currently located. Through this, the information processing apparatus 101 can obtain the necessary information at an appropriate time and present the information to the user through the guide app.

The foregoing embodiment described in example where the information processing apparatus 101 displays a UI including information for guiding the user to a communication apparatus 151 in the periphery, detailed information of a product on display in the periphery of a communication apparatus 151, and so on. This is merely an example, however, and advertising information specified on the basis of the order information may be used in any manner. For example, the information processing apparatus 101 may use the advertising information specified on the basis of the order information for an internal process. Even in such a case, by obtaining information only from a communication apparatus 151 determined to satisfy a predetermined condition, the frequency with which the information processing apparatus 101 carries out communication for obtaining information can be reduced, and the load of processing using the obtained information can be lightened as well.

Additionally, although the foregoing embodiment described an example in which the information processing apparatus 101 receives BLE advertising information from each of the communication apparatuses 151 in the periphery and creates the advertisement list, the configuration is not limited thereto. In other words, the information processing apparatus 101 may create the advertisement list using another communication method. Additionally, the information processing apparatus 101 may obtain information corresponding to the advertisement list from another device (e.g., the server 121). The "information corresponding to the advertisement list" can include at least one of information indicating the communication apparatus, information indicating to which group the communication apparatus belongs, information indicating the number of communication apparatuses belonging to that group, and the permitted reception angle for each communication apparatus 151. When the information corresponding to the advertisement list has been obtained from another device, the information processing apparatus 101 uses predetermined signals (e.g., the BLE advertising information) sent from communication apparatuses 151 in the periphery using short-range wireless communication to detect those communication apparatuses 151. Then, on the basis of which communication apparatuses 151 have been detected, the information processing apparatus 101 can determine whether a number of communication apparatuses greater than or equal to the predetermined percentage have been detected from among the communication apparatuses belonging to each group. Note that the information processing apparatus 101 may obtain identification information (e.g., a UUID) of each group and information of the number of communication apparatuses belonging to that group from another device, and specify information indicating which group each communication apparatus belongs to on the basis of a predetermined signal sent from the communication apparatus. In other words, some of the information included in the advertisement list may be obtained from another device, and the other information may be obtained from a signal sent from each communication apparatus. Additionally, the information processing apparatus 101 specifies a positional relationship, including the direction in which the communication apparatus 151 is present, in detail, using that predetermined signal. Then, on the basis of at least one of the positional relationship and information pertaining to the group of the communication apparatus 151, the information processing apparatus 101 determines for which of the plurality of communication apparatuses 151 the related information is to be obtained. Through this, the frequency with which the information processing apparatus 101 carries out communication for obtaining information can be reduced, and the load of processing using the obtained information can be lightened as well. Likewise, the information processing apparatus 101 may obtain information corresponding to the advertisement list, including information such as the order information, the detailed information obtainment distance, and so on for each communication apparatus, using a communication method aside from BLE, or from another device.

According to the present invention, convenience can be improved for a user in an information processing system which uses communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103175, filed May 31, 2019 which is hereby incorporated by reference herein in its entirety.

What is claimed is:

1. An information processing method executed by an information processing apparatus, the apparatus communicating with a plurality of communication apparatuses each belonging to one of a plurality of groups, the method comprising:

receiving a predetermined signal sent from each of the plurality of communication apparatuses;

specifying a first group, among the plurality of groups, that satisfies a predetermined condition; and executing processing based on the predetermined signal sent from a communication apparatus belonging to the first group satisfying the predetermined condition, and not executing the processing based on the predetermined signal sent from a communication apparatus belonging to a second group different from the first group, wherein the first group is specified as a group satisfying the predetermined condition on the basis of at least that the first group includes greater than or equal to a predetermined percentage or greater than or equal to a predetermined number of communication apparatuses that sent the predetermined signal received by the information processing apparatus and that the first group includes greater than or equal to a specific percentage or greater than or equal to a specific number of communication apparatuses that sent the predetermined signal arriving within a predetermined angular range based on a direction in which the information processing apparatus is facing.

2. The information processing method according to claim 1,
wherein the predetermined percentage and the specific percentage are the same, or the predetermined number and the specific number are the same.

3. The information processing method according to claim 1,
wherein the predetermined angular range is set individually for each of the plurality of communication apparatuses.

4. The information processing method according to claim 1,
wherein the predetermined signal is a signal including Bluetooth Low Energy (BLE) advertising information.

5. The information processing method according to claim 4,
wherein the predetermined signal is a signal including advertising information of BLE included in the Bluetooth 5.1 standard.

6. An information processing method executed by an information processing apparatus, the apparatus communicating with a plurality of communication apparatuses each belonging to one of a plurality of groups, the method comprising:
receiving a predetermined signal sent from each of the plurality of communication apparatuses;
specifying a first group, among the plurality of groups, that satisfies a predetermined condition; and
executing processing based on the predetermined signal sent from a communication apparatus belonging to the first group satisfying the predetermined condition, and not executing the processing based on the predetermined signal sent from a communication apparatus belonging to a second group different from the first group,
wherein the first group is specified as a group satisfying the predetermined condition on the basis of that the first group includes greater than or equal to a predetermined percentage or greater than or equal to a predetermined number of communication apparatuses that sent the predetermined signal arriving within a predetermined angular range based on a direction in which the information processing apparatus is facing.

7. The information processing method according to claim 6,
wherein the predetermined angular range is set individually for each of the plurality of communication apparatuses.

8. The information processing method according to claim 6,
wherein the processing based on the predetermined signal sent from a communication apparatus belonging to the first group, which is executed, is processing for displaying, in a display, a screen based on the predetermined signal sent from a communication apparatus belonging to the first group; and
the processing based on the predetermined signal sent from a communication apparatus belonging to the second group, which is not executed, is processing for displaying, in the display, a screen based on the predetermined signal sent from a communication apparatus belonging to the second group.

9. The information processing method according to claim 6,
wherein the predetermined signal is a signal including Bluetooth Low Energy (BLE) advertising information.

10. The information processing method according to claim 9,
wherein the predetermined signal is a signal including advertising information of BLE included in the Bluetooth 5.1 standard.

11. An information processing method executed by an information processing apparatus, the apparatus communicating with a plurality of communication apparatuses each belonging to one of a plurality of groups, the method comprising:
receiving a predetermined signal sent from each of the plurality of communication apparatuses;
specifying a first group, among the plurality of groups, that satisfies a predetermined condition; and
executing processing based on the predetermined signal sent from a communication apparatus belonging to the first group satisfying the predetermined condition, and not executing the processing based on the predetermined signal sent from a communication apparatus belonging to a second group different from the first group,
wherein the first group is specified as a group satisfying the predetermined condition on the basis of at least that the first group includes greater than or equal to a predetermined percentage or greater than or equal to a predetermined number of communication apparatuses that sent the predetermined signal received by the information processing apparatus,
wherein the processing based on the predetermined signal sent from a communication apparatus belonging to the first group, which is executed, is processing for displaying, in a display, a screen based on the predetermined signal sent from a communication apparatus belonging to the first group, and
wherein the processing based on the predetermined signal sent from a communication apparatus belonging to the second group, which is not executed, is processing for displaying, in the display, a screen based on the predetermined signal sent from a communication apparatus belonging to the second group.

12. An information processing apparatus that communicates with a plurality of communication apparatuses each belonging to one of a plurality of groups, the information processing apparatus comprising:
one or more processors; and
one or more memories that store a computer-readable instruction for causing, when executed by the one or more processors, the one or more processors to:

receive a predetermined signal sent from each of the plurality of communication apparatuses;

specify a first group, among the plurality of groups, that satisfies a predetermined condition; and execute processing based on the predetermined signal sent from a communication apparatus belonging to the first group satisfying the predetermined condition, and not execute the processing based on the predetermined signal sent from a communication apparatus belonging to a second group different from the first group, wherein the first group is specified as a group satisfying the predetermined condition on the basis of at least that the first group includes greater than or equal to a predetermined percentage or greater than or equal to a predetermined number of communication apparatuses that sent the predetermined signal received by the information processing apparatus and that the first group includes greater than or equal to a specific percentage or greater than or equal to a specific number of communication apparatuses that sent the predetermined signal arriving within a predetermined angular range based on a direction in which the information processing apparatus is facing.

* * * * *